(12) United States Patent
Nanamura et al.

(10) Patent No.: US 7,937,458 B2
(45) Date of Patent: May 3, 2011

(54) ON-DEMAND SOFTWARE SERVICE SYSTEM AND METHOD

(76) Inventors: Roberto N. Nanamura, Charlotte, NC (US); Clemans Abujamra, Charlotte, NC (US)

( * ) Notice: Subject to any disclaimer, the term of this patent is extended or adjusted under 35 U.S.C. 154(b) by 441 days.

(21) Appl. No.: 11/707,357

(22) Filed: Feb. 13, 2007

(65) Prior Publication Data
US 2007/0208834 A1 Sep. 6, 2007

Related U.S. Application Data

(60) Provisional application No. 60/773,372, filed on Feb. 14, 2006.

(51) Int. Cl.
*G06F 15/177* (2006.01)
(52) U.S. Cl. ................ 709/221; 705/51; 700/94; 726/4; 717/176
(58) Field of Classification Search .................. 709/221, 709/220, 227
See application file for complete search history.

(56) References Cited

U.S. PATENT DOCUMENTS

| | | | |
|---|---|---|---|
| 5,991,402 A | 11/1999 | Jia et al. | |
| 6,035,423 A * | 3/2000 | Hodges et al. | 714/38 |
| 6,560,456 B1 * | 5/2003 | Lohtia et al. | 455/445 |
| 6,754,896 B2 * | 6/2004 | Mishra et al. | 717/176 |
| 7,320,068 B2 * | 1/2008 | Zimniewicz et al. | 713/1 |
| 7,529,738 B2 * | 5/2009 | Christiance et al. | 707/3 |
| 2002/0133723 A1 * | 9/2002 | Tait | 713/201 |
| 2002/0152395 A1 | 10/2002 | Zhang et al. | |
| 2004/0054923 A1 * | 3/2004 | Seago et al. | 713/201 |
| 2006/0031529 A1 * | 2/2006 | Keith, Jr. | 709/227 |
| 2007/0130075 A1 * | 6/2007 | Song et al. | 705/51 |
| 2007/0259715 A1 * | 11/2007 | McNutt et al. | 463/29 |
| 2008/0255692 A1 * | 10/2008 | Hofrichter et al. | 700/94 |
| 2008/0255953 A1 * | 10/2008 | Chang et al. | 705/14 |

* cited by examiner

*Primary Examiner* — Phuoc Nguyen
*Assistant Examiner* — Kishin G Belani
(74) *Attorney, Agent, or Firm* — Gordon & Rees LLP

(57) ABSTRACT

An on-demand software and service access system has a remote processing system or remote service provider accessible via the Internet or other network, and a local system which runs on a user's local device. The remote system has a plurality of different software applications, operating systems, and central data storage means for selective access by authorized users from their local computer via a network or the Internet, as well as a profile manager for providing user registration, user login, and loading of user selected settings and services onto the local system. Usage of the selected software applications is provided on a subscription basis for applications required by users on a daily basis, as well as on a one-time purchase basis, for one time use, for use only for a specific time period, or permanently.

20 Claims, 23 Drawing Sheets

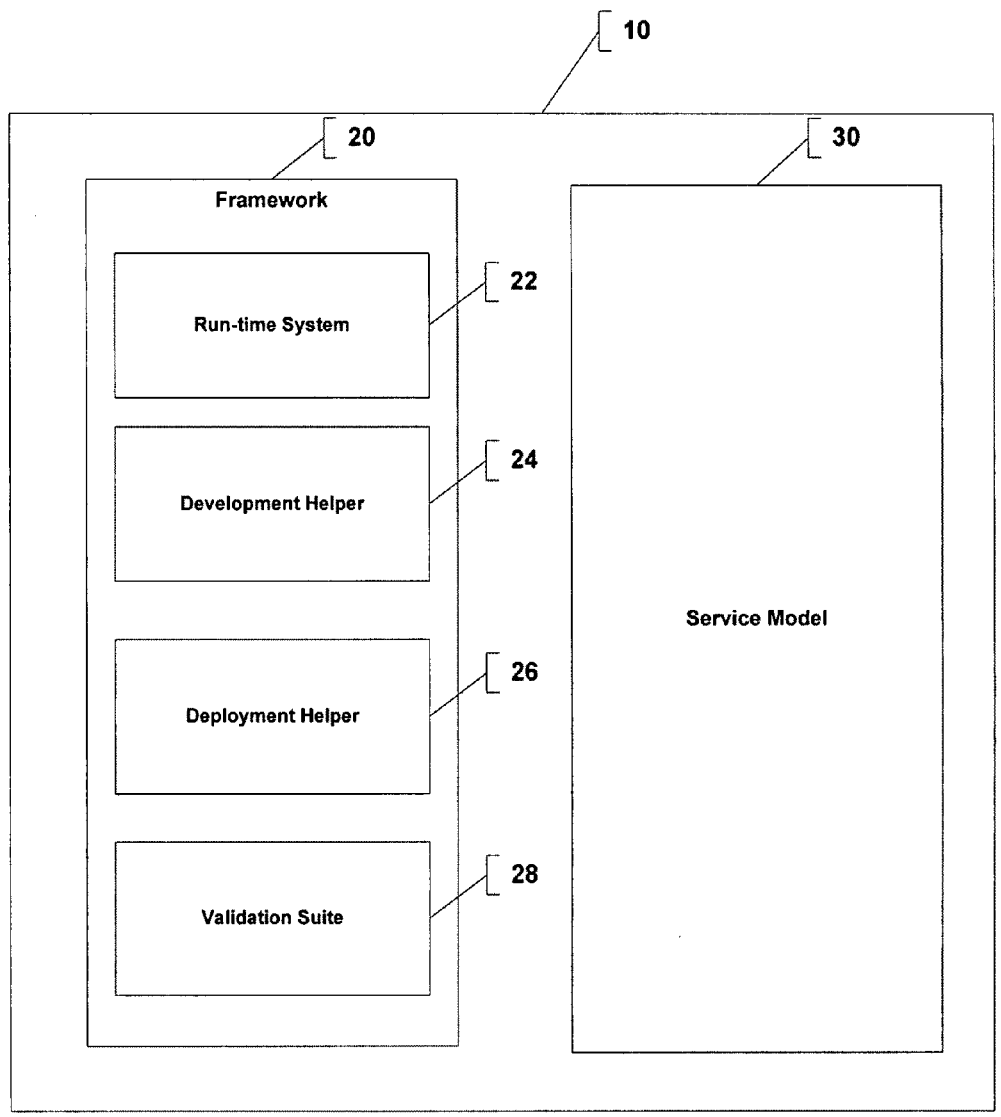
Figure 1 – System Components

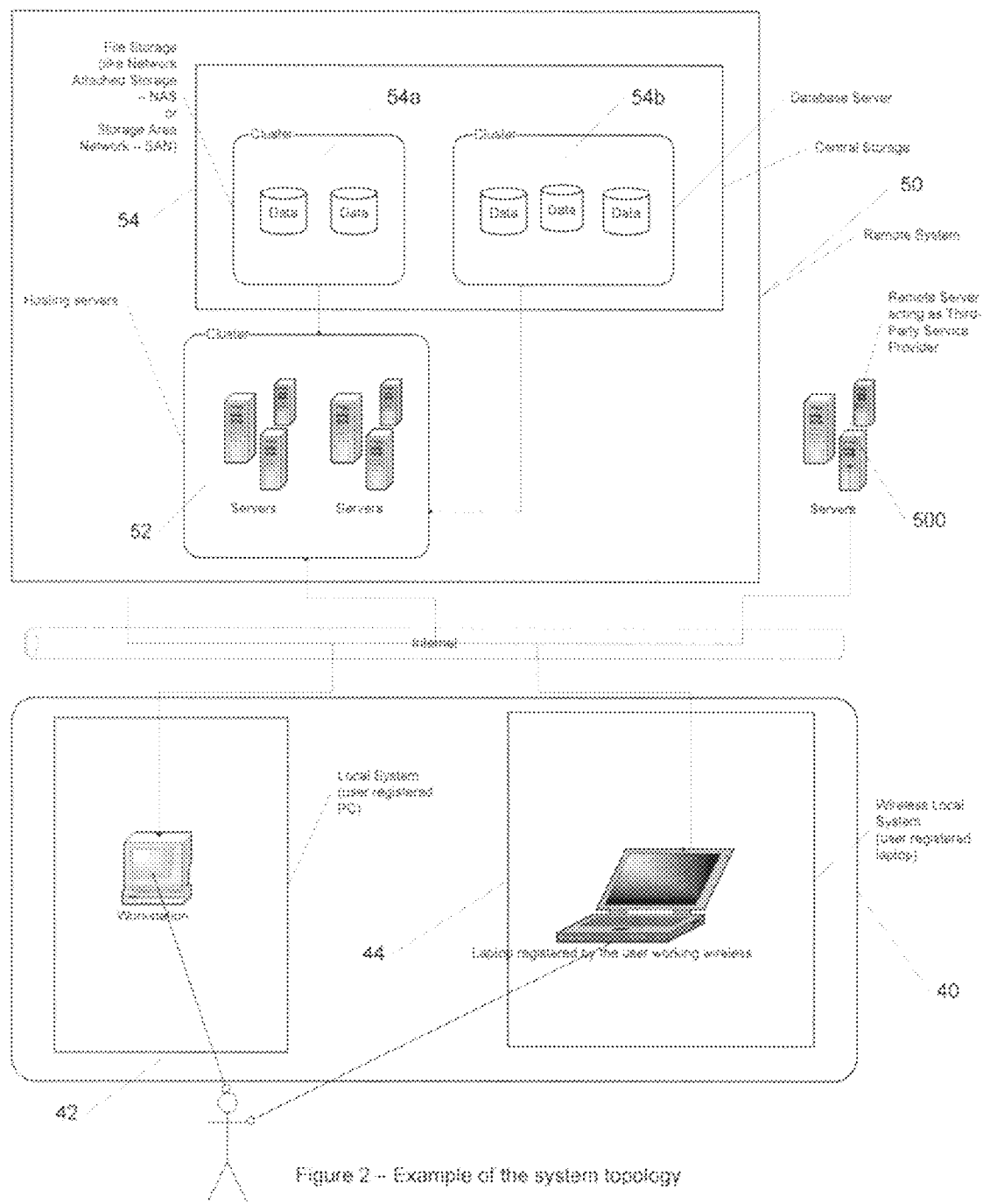
Figure 2 – Example of the system topology

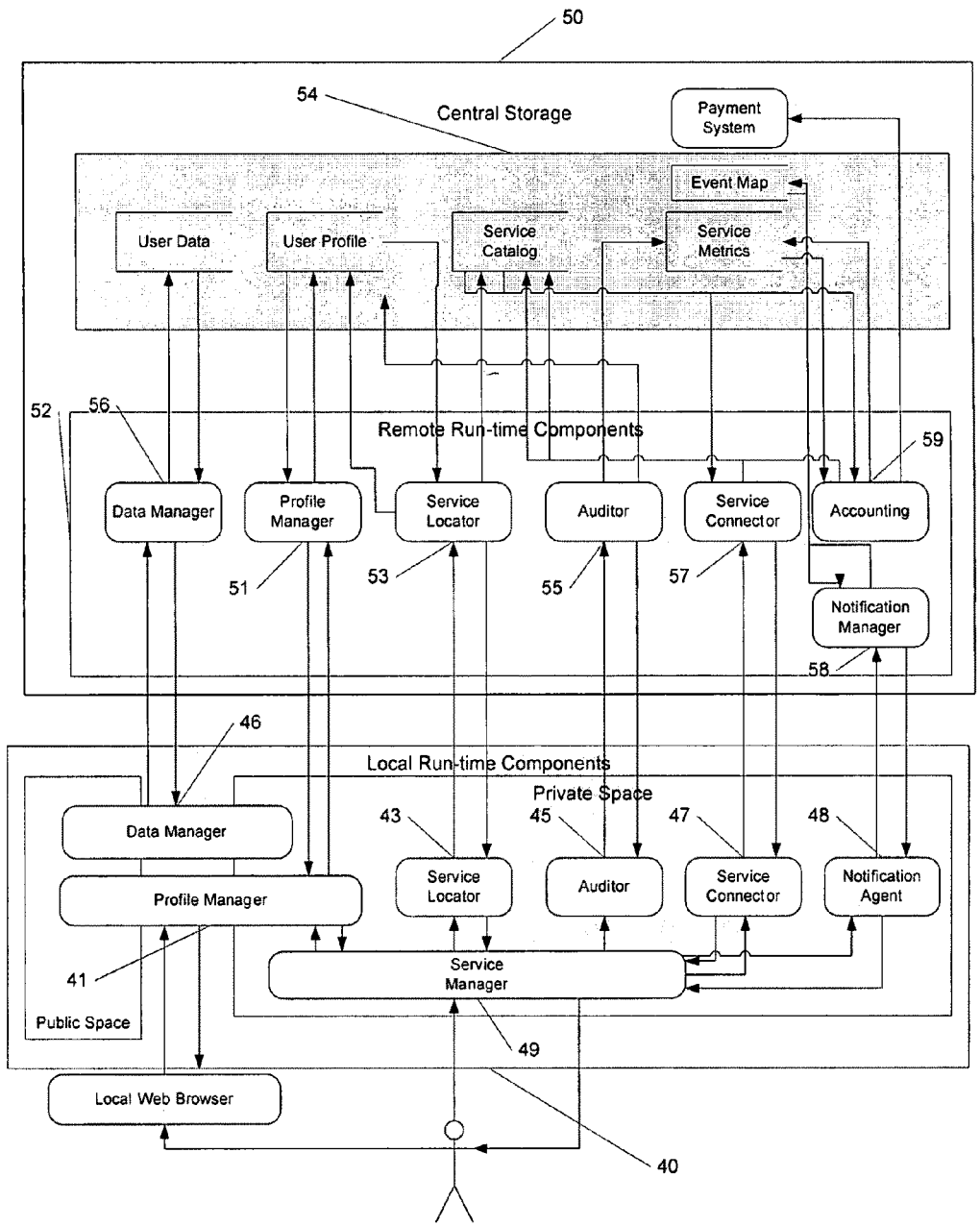
Figure 3 – Relationship between Components of the Run-time System

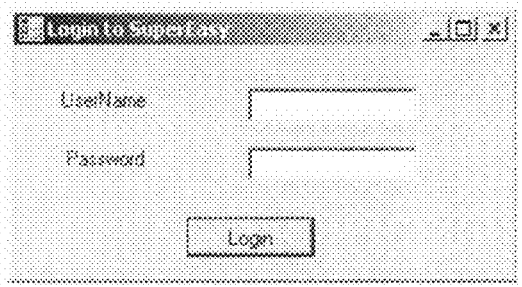
Figure 4 – The Login Window
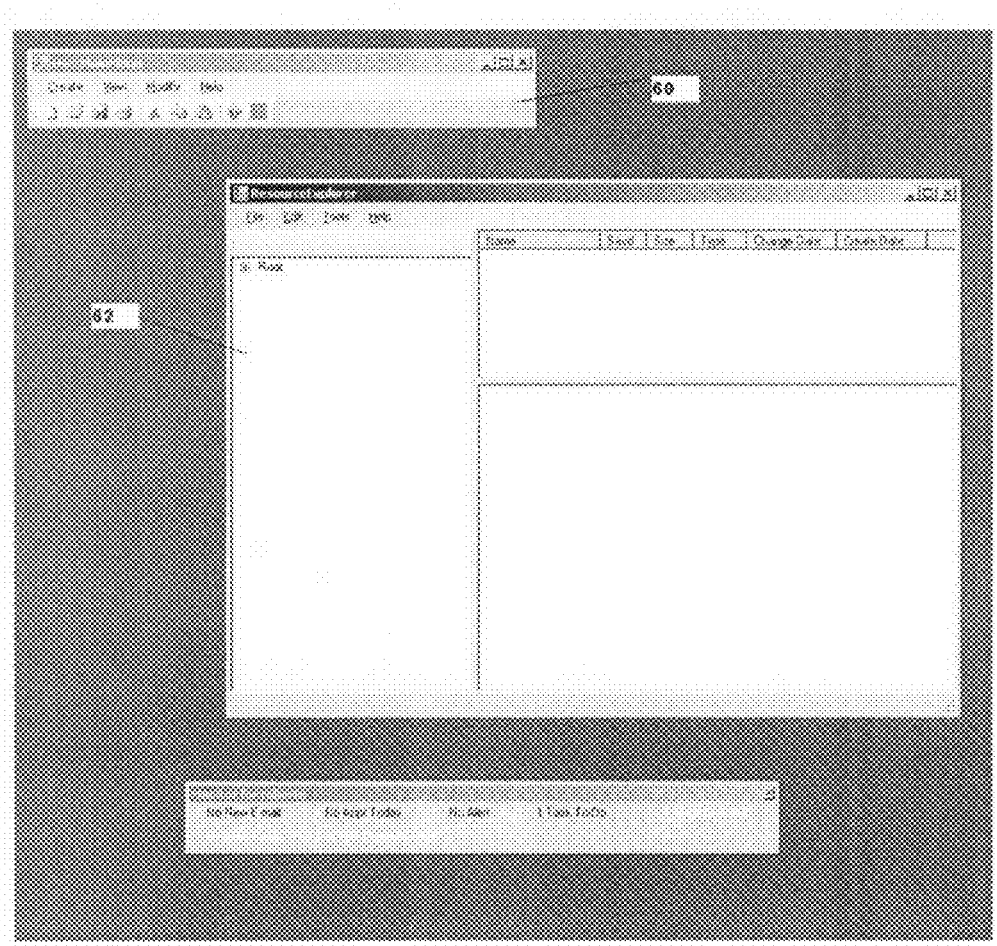
Figure 5 - Screenshot of the system after login

Figure 6 – User Service Menu
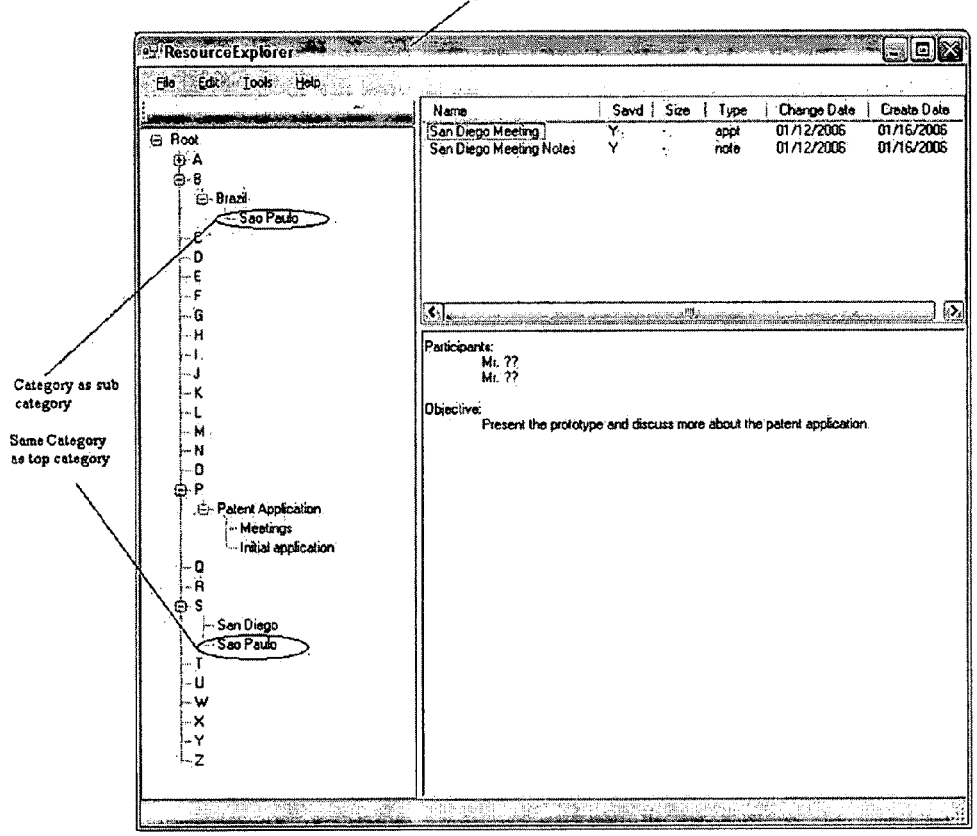
Figure 7 – The Resource Explorer

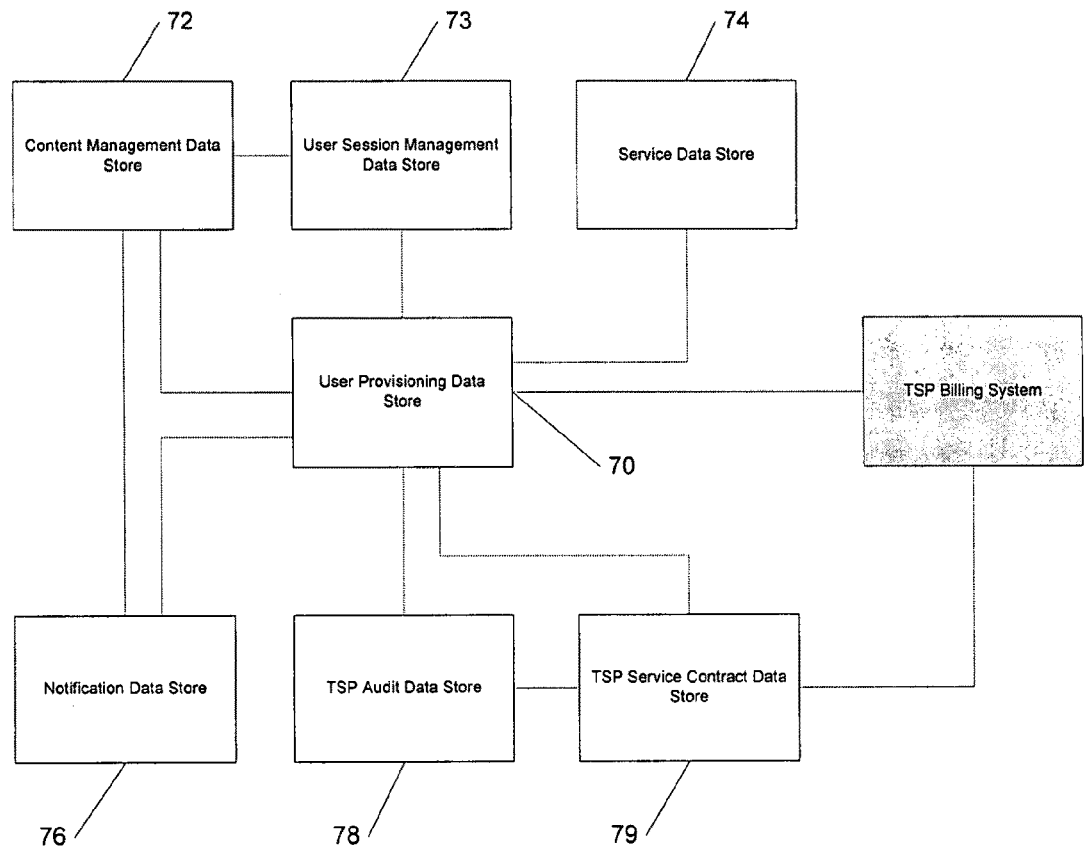
Figure 8 – Data Stores and Their Relationships

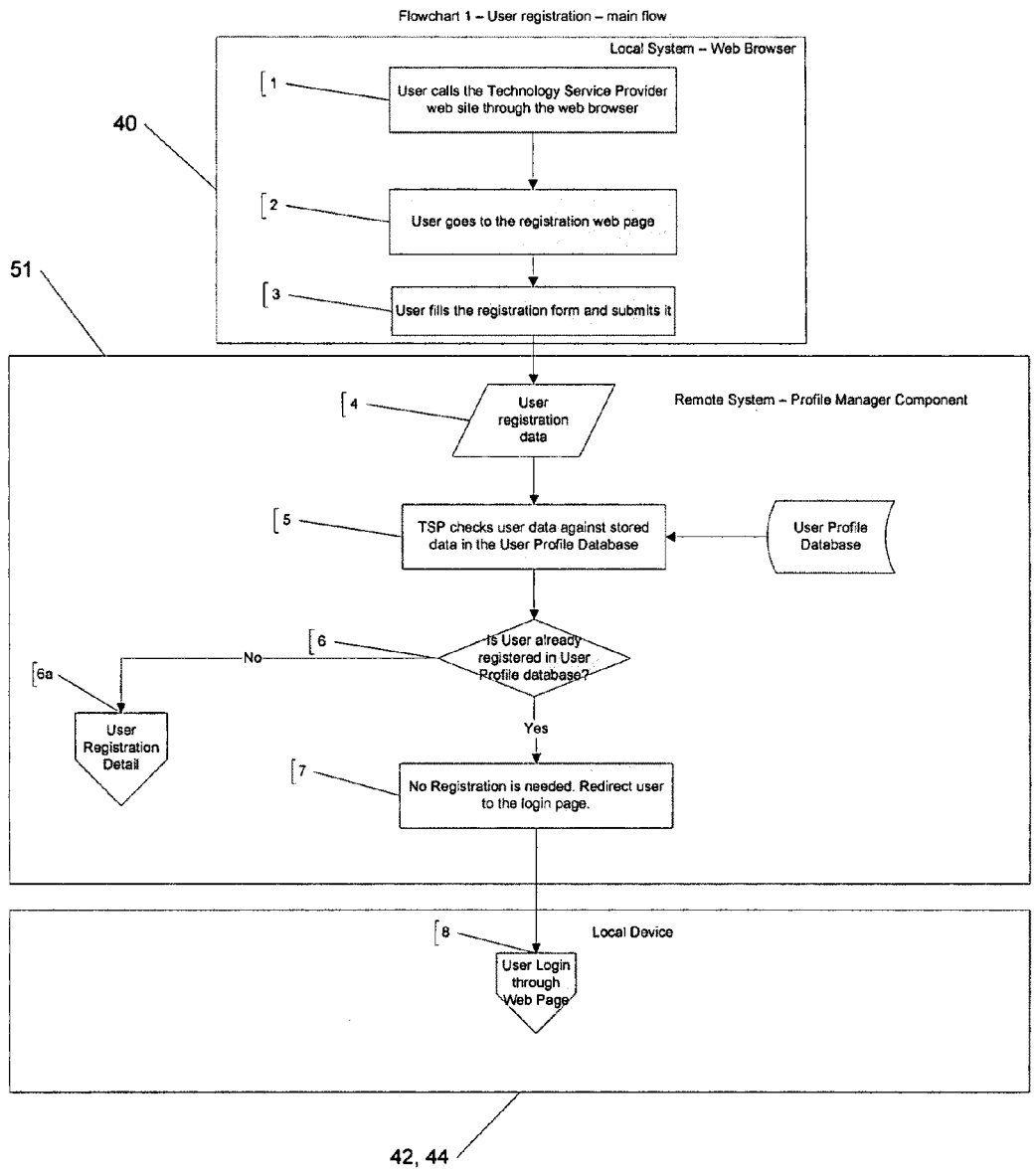
Figure 9 – Flowchart representing the first interaction of the user with the run-time system.

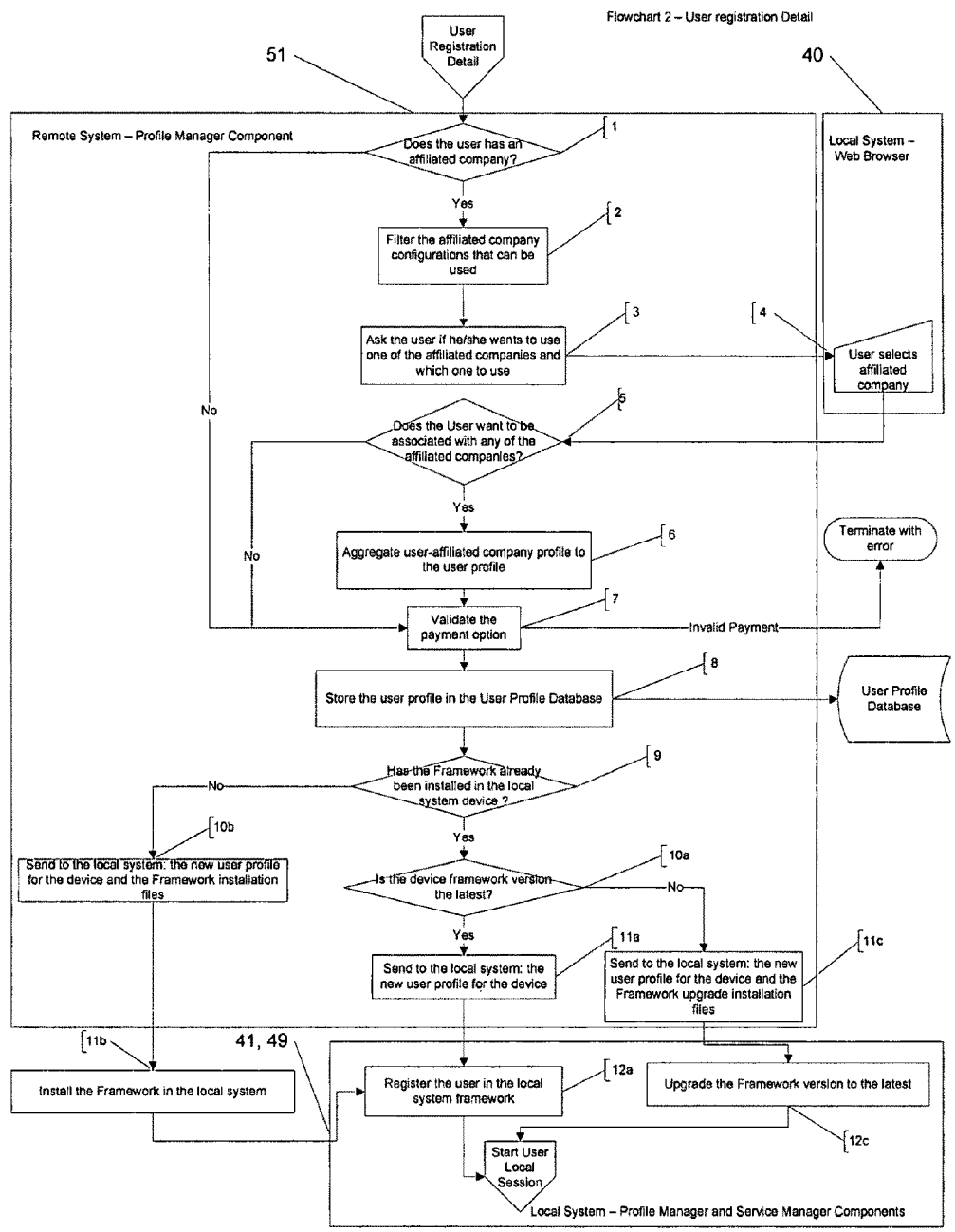
Figure 10 – Flowchart representing detailed interaction of the user with the run-time system

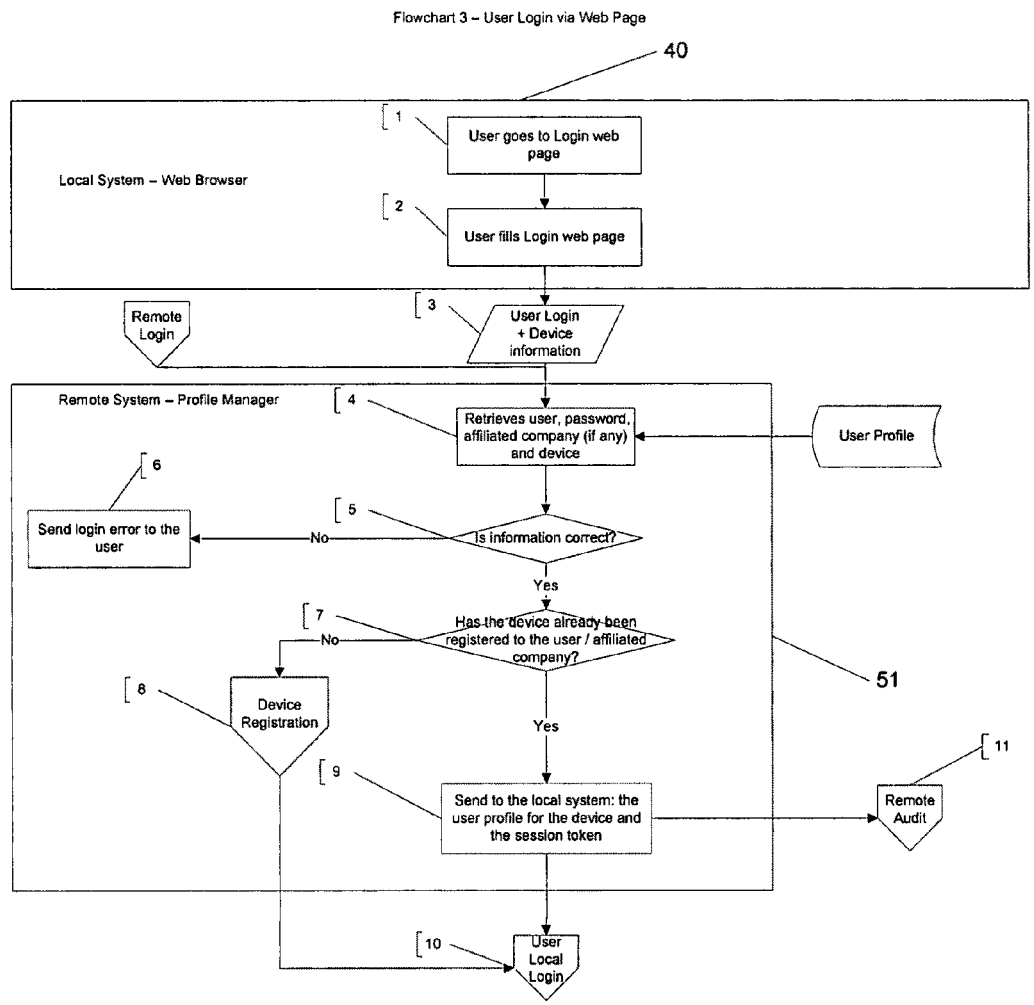
Figure 11 – User login through a web browser

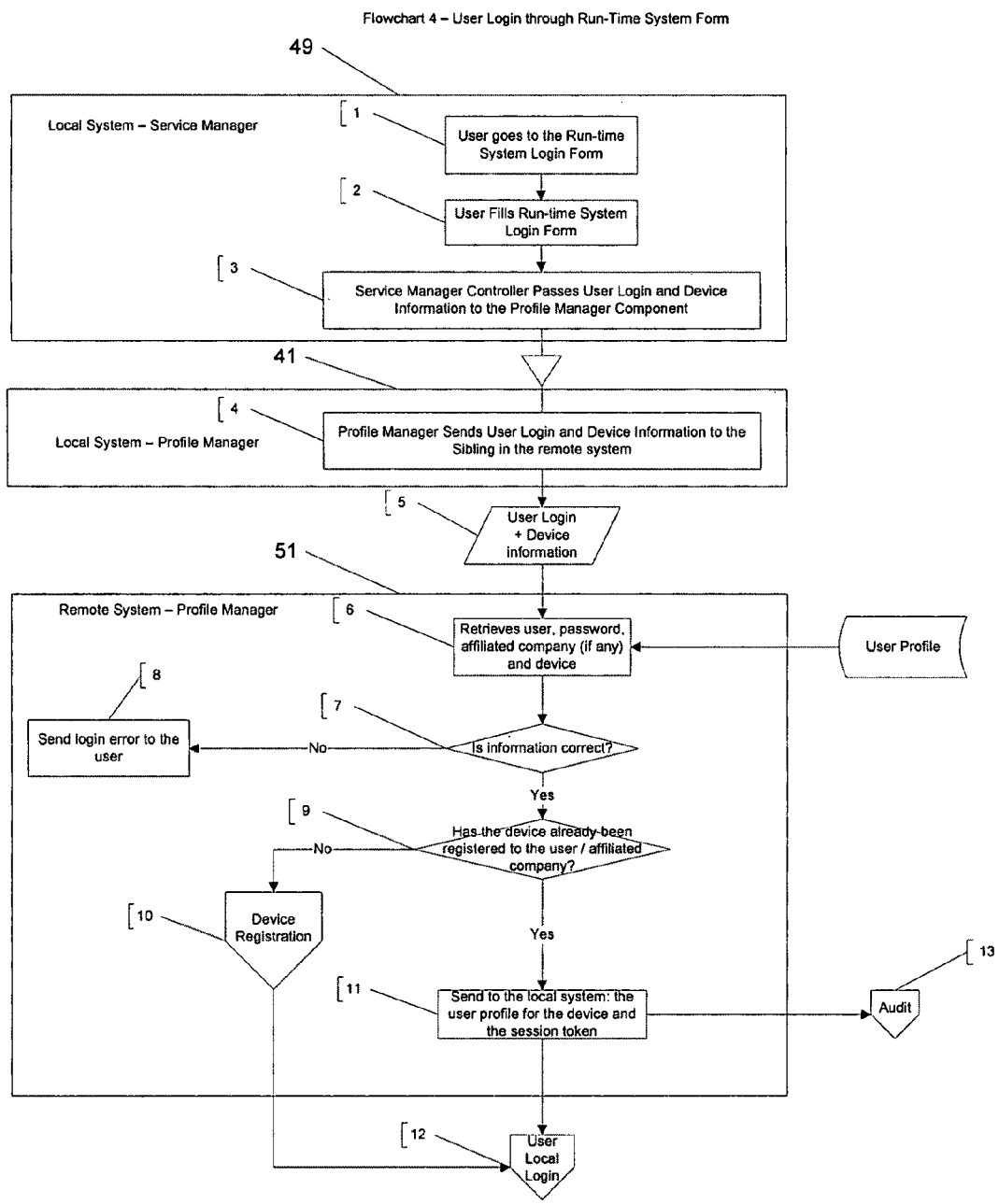
Figure 12 – User login through run-time system (22) form

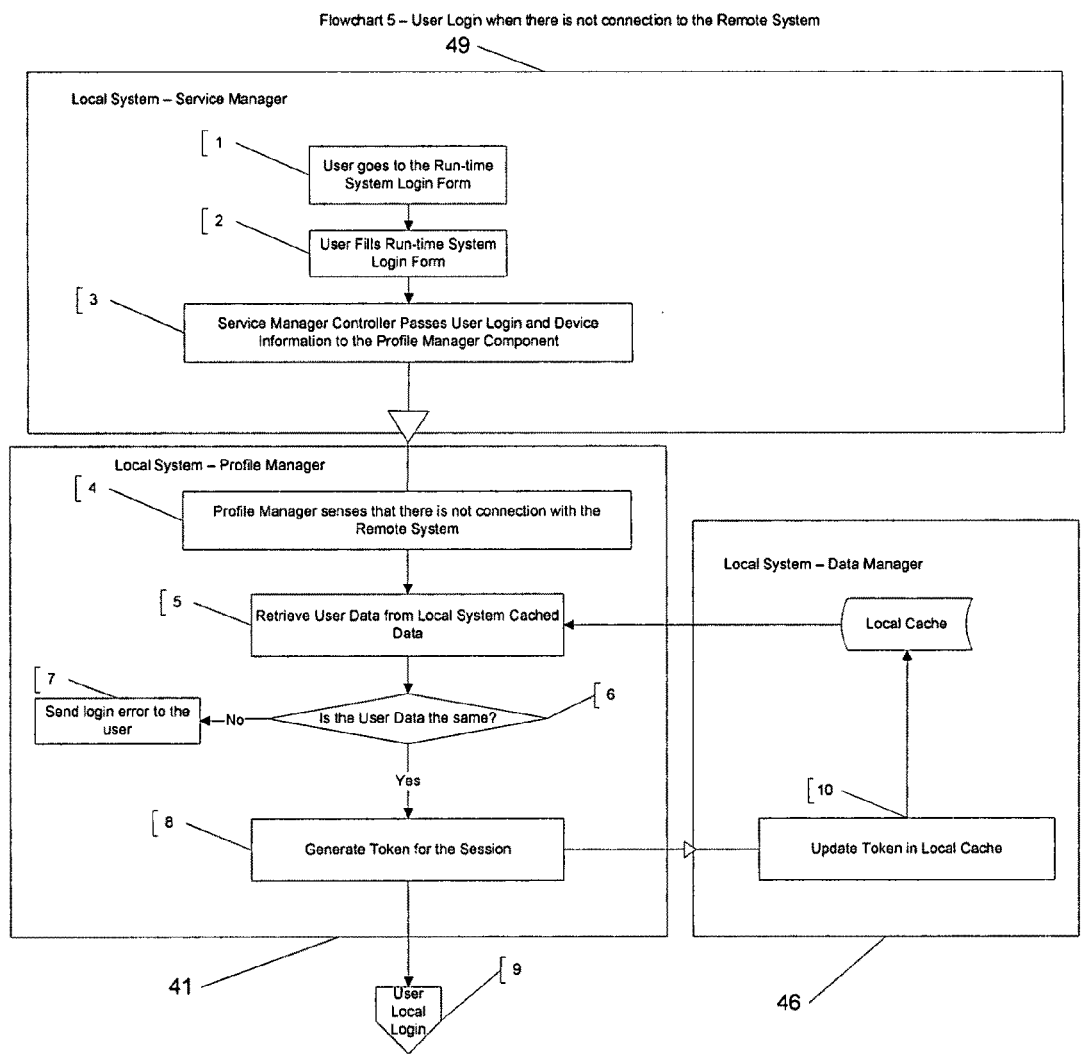
Figure 13 – Login without connection to the remote system

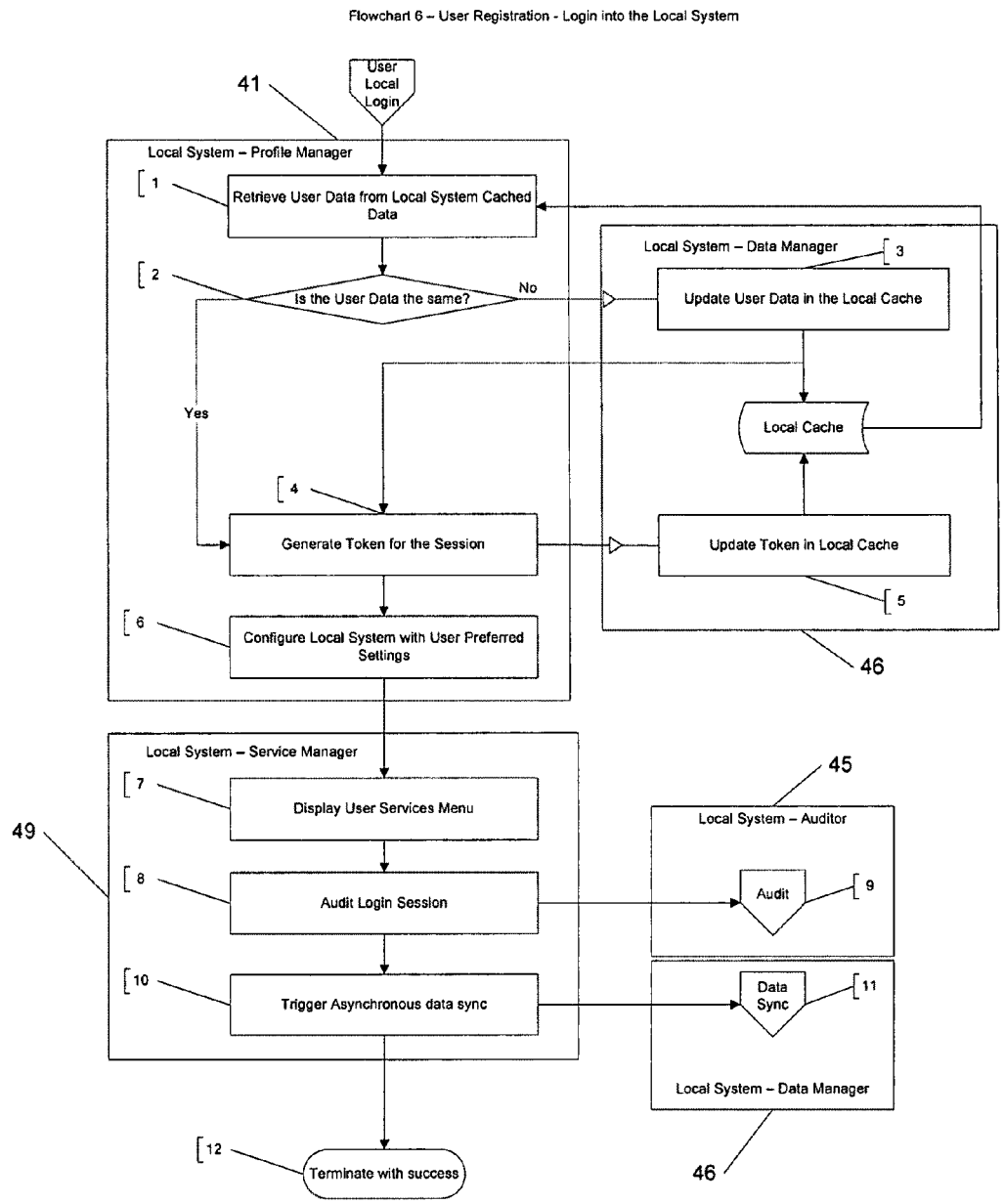
Figure 14 – User login into the local system

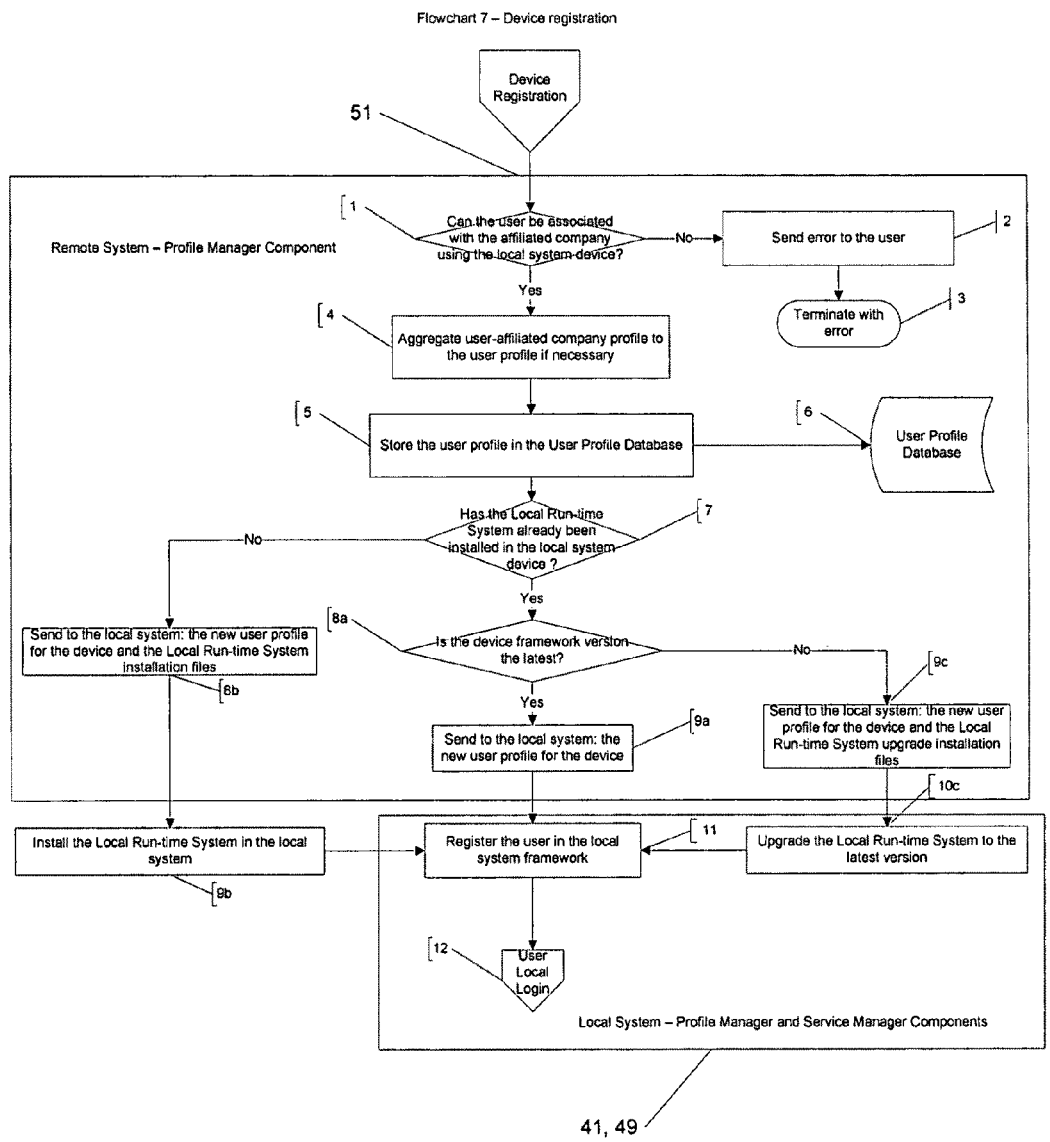
Figure 15 – Local device registration

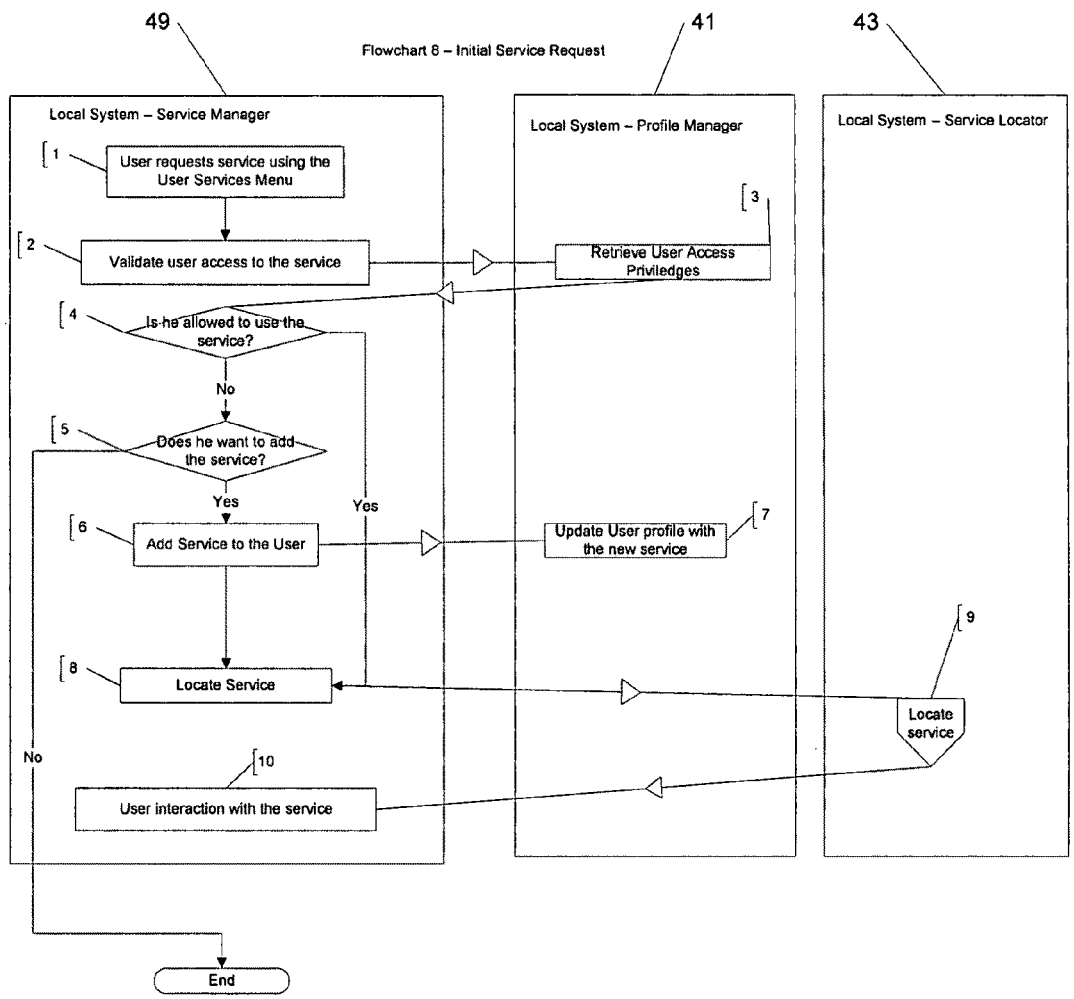
Figure 16 – Initial Service Request

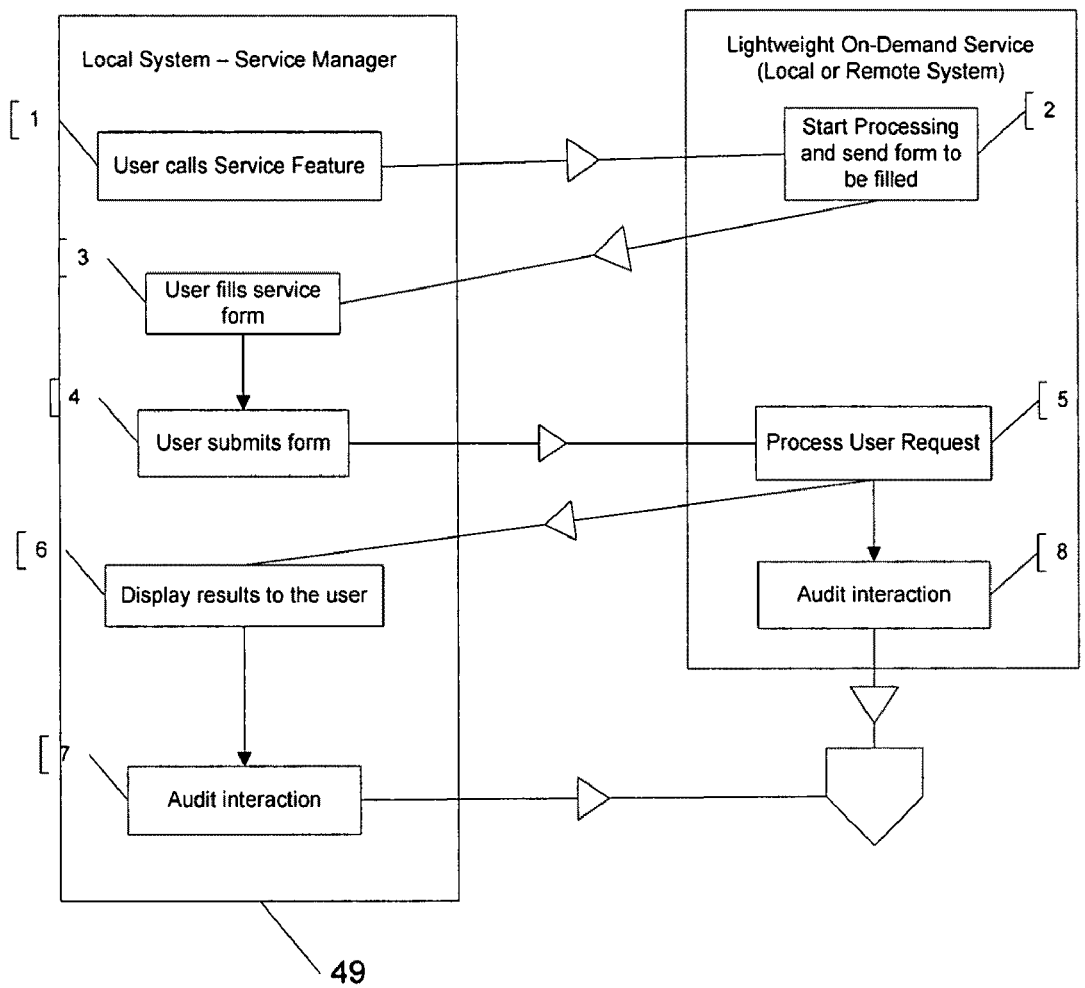
Figure 17 – User interaction with the service

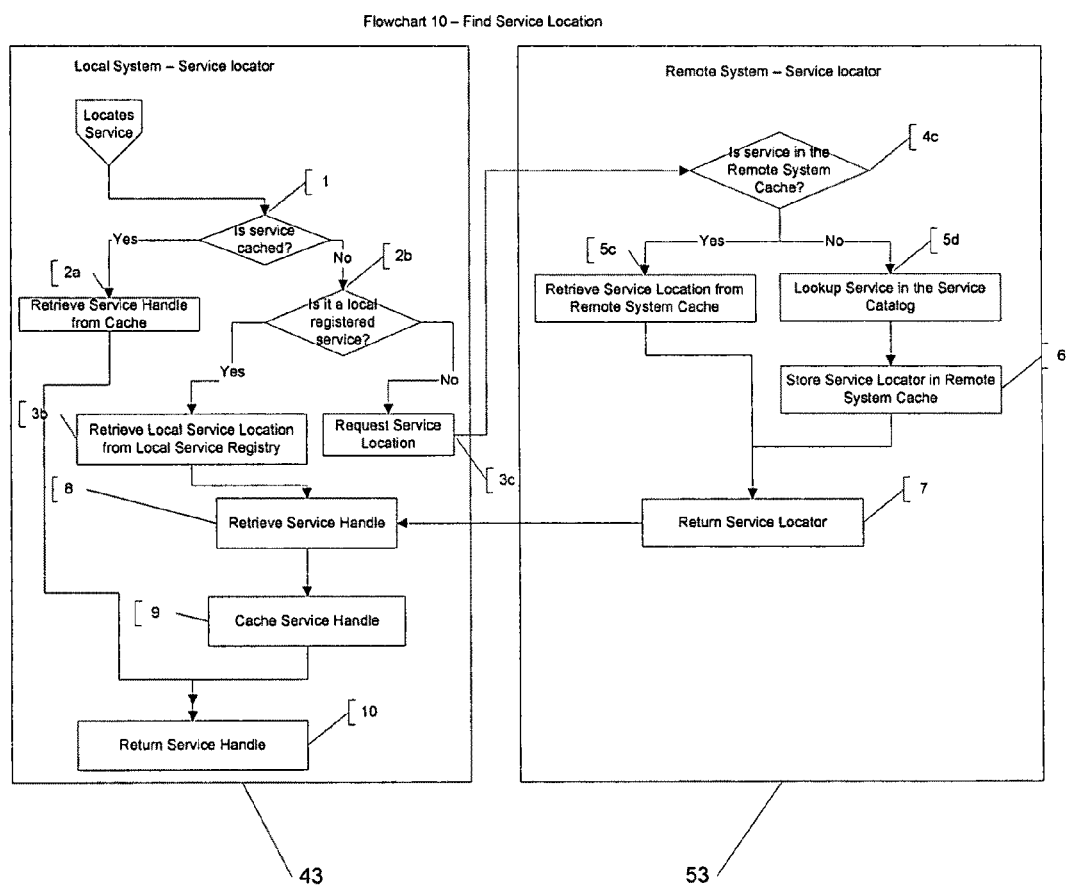
Figure 18 – Finding a service location

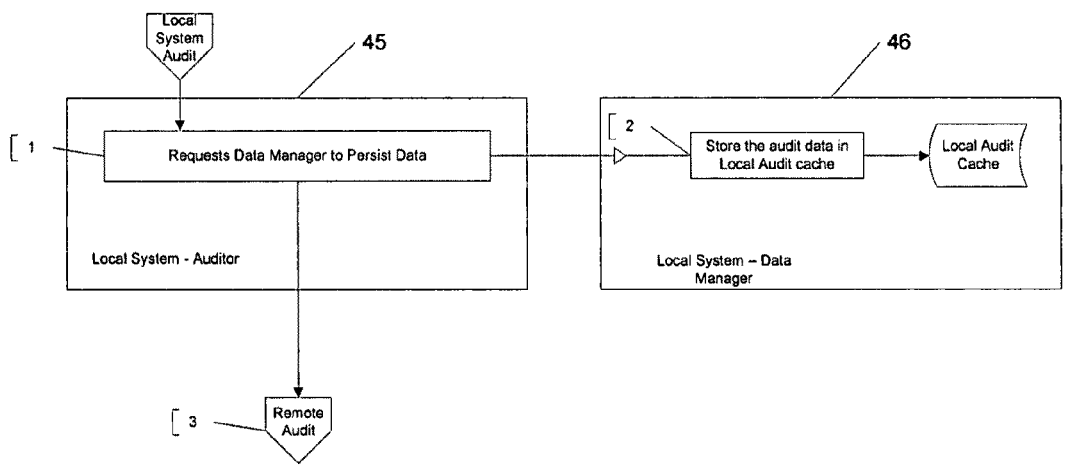
Figure 19 – Local Audit
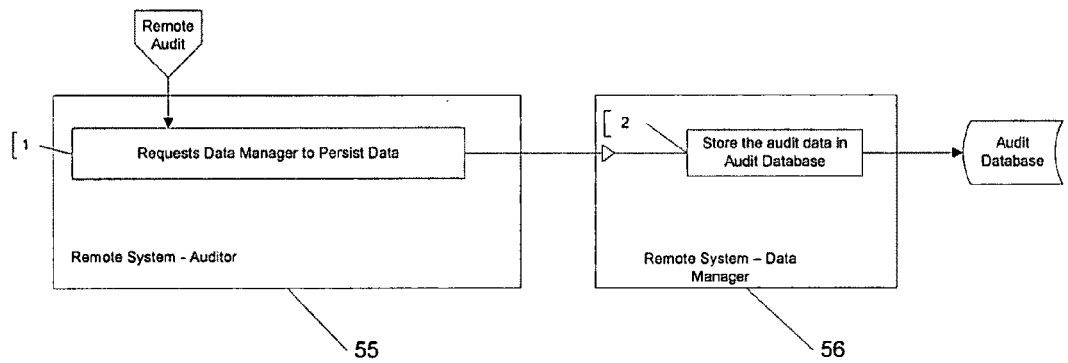
Figure 20 – Remote Audit

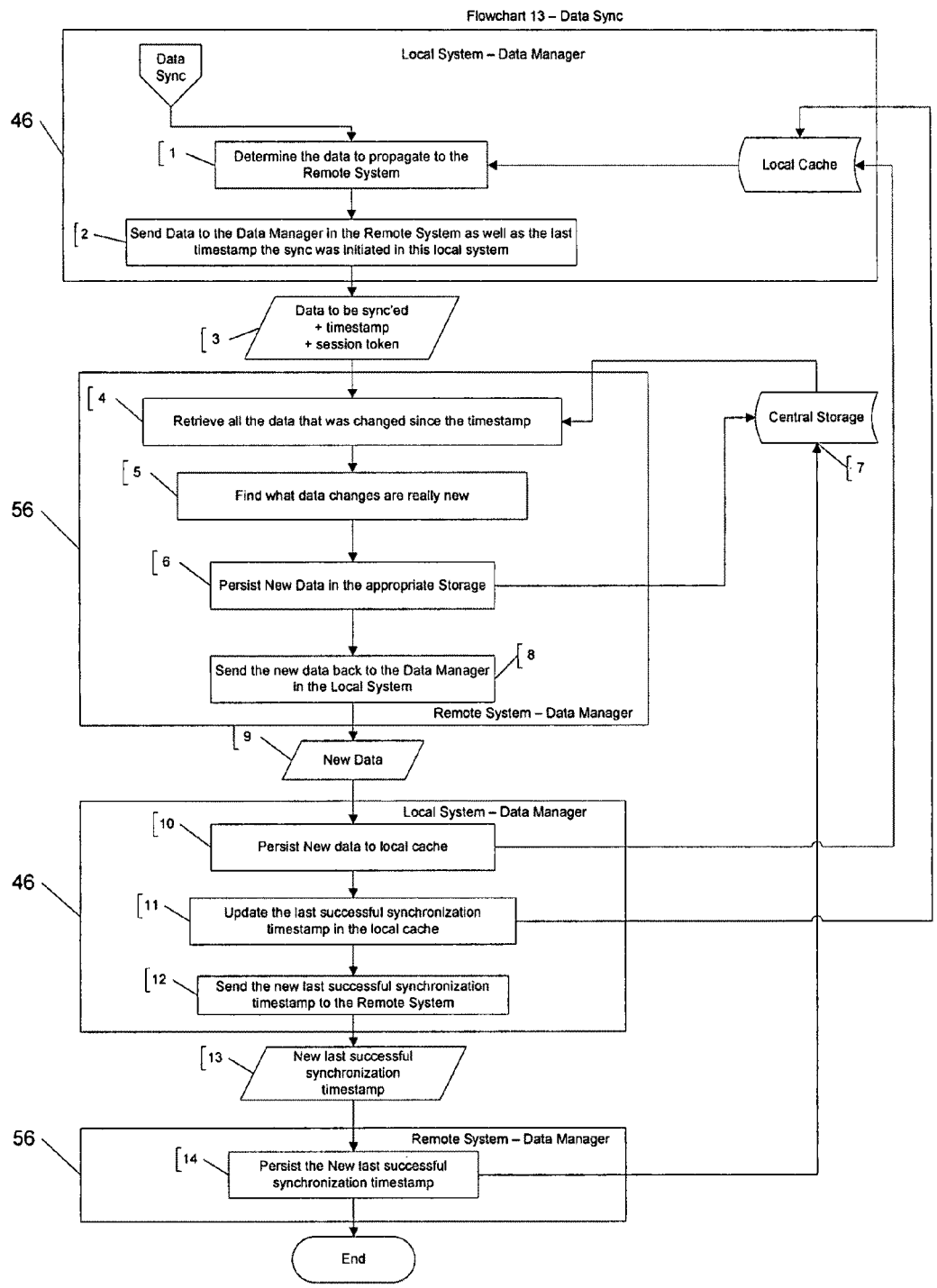
Figure 21 – Data Synchronization

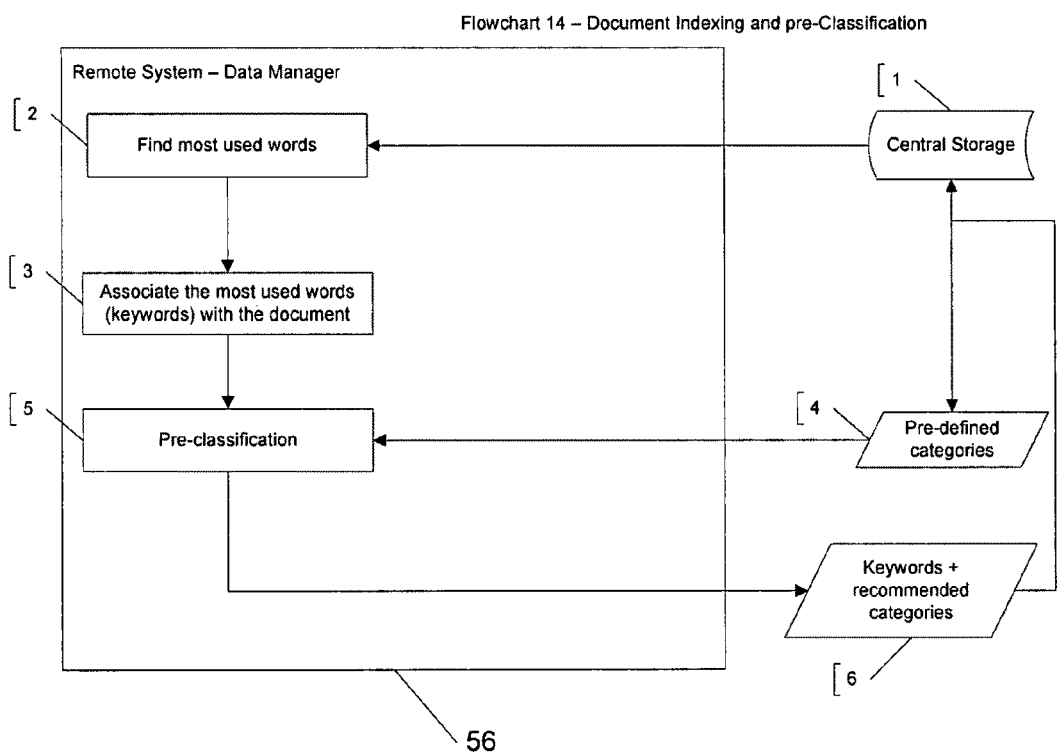
Figure 22 – Document Classification

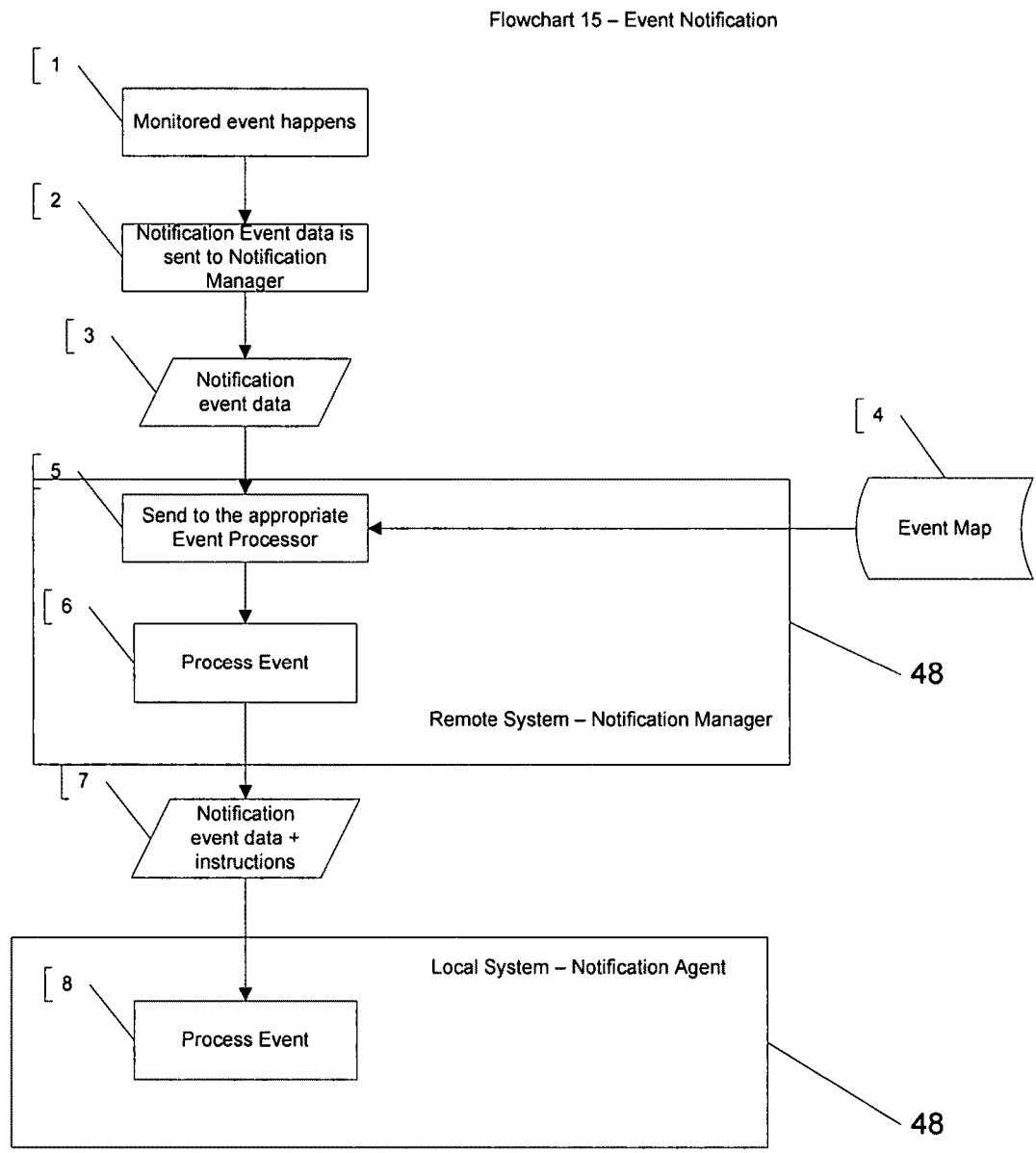
Figure 23 – Event Notification

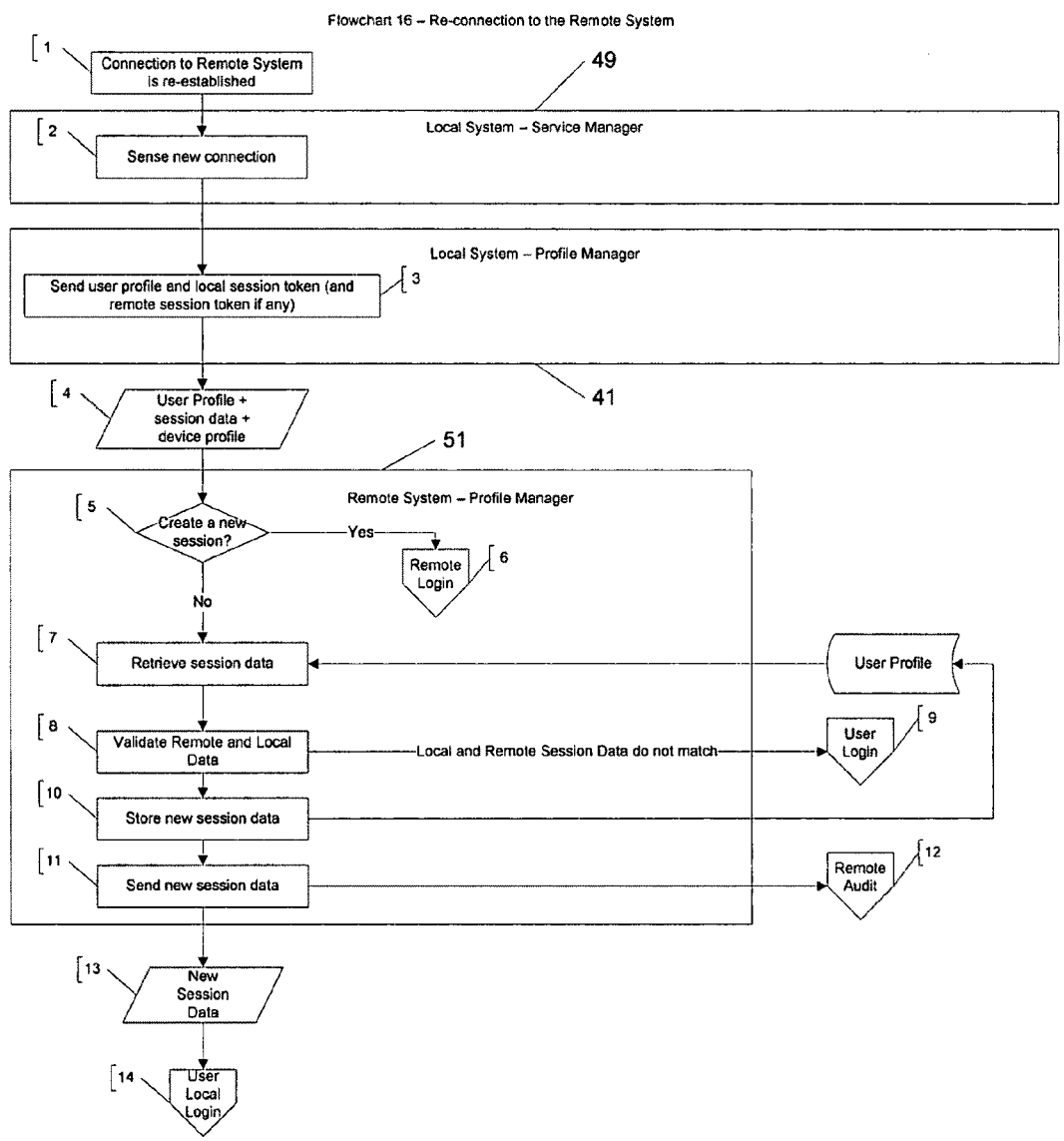
Figure 24 – Re-connection to the remote system

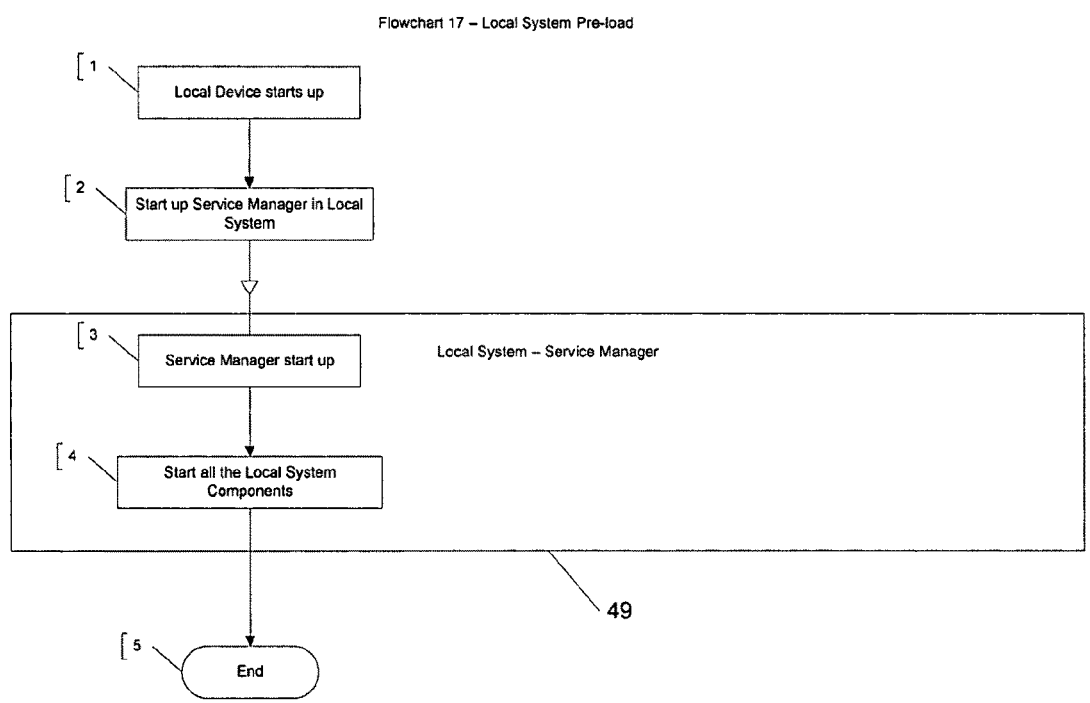
Figure 25 – Local system pre-load

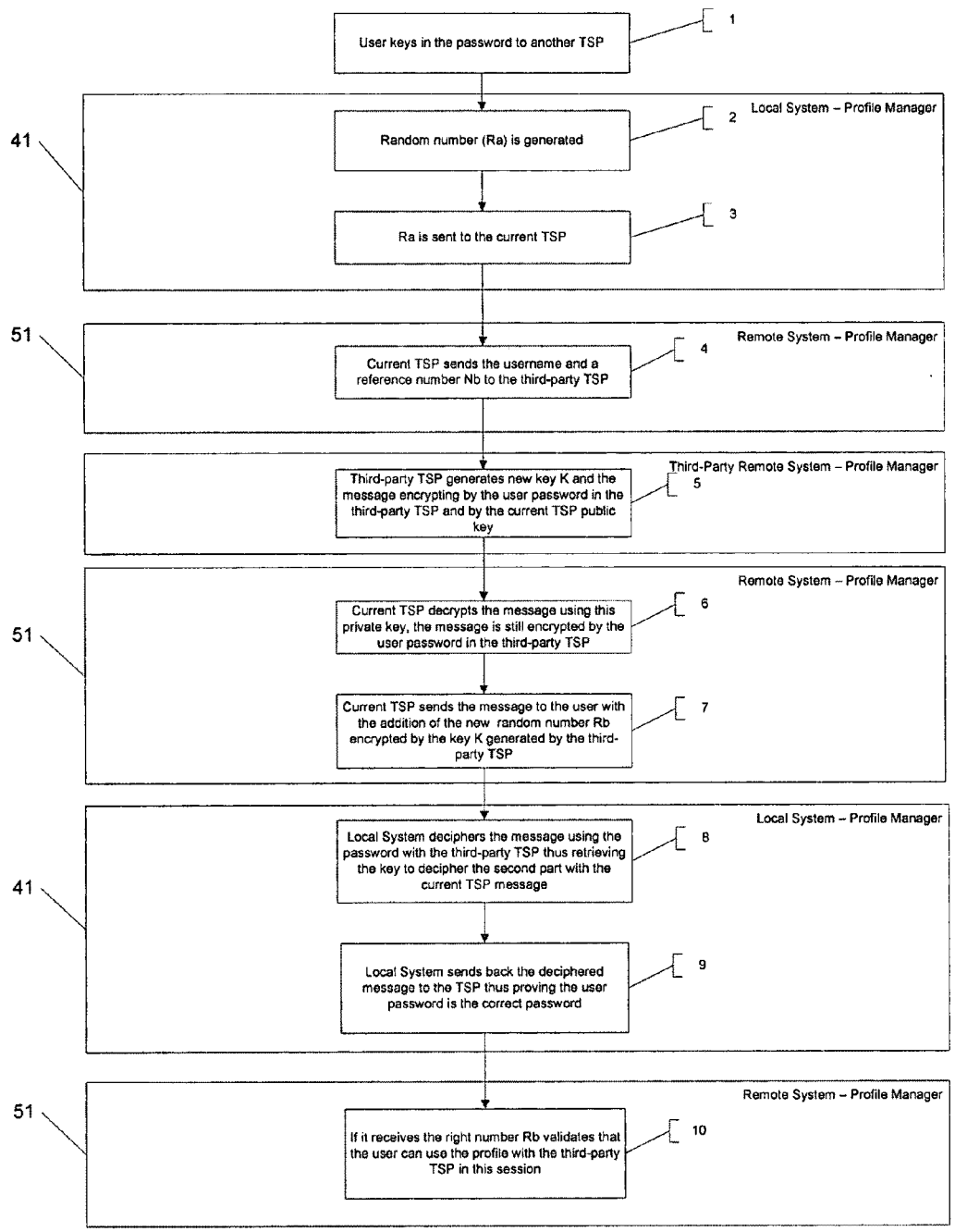
Figure 26 – Third Part TSP User Authentication

ON-DEMAND SOFTWARE SERVICE SYSTEM AND METHOD

RELATED APPLICATION

The present application is a utility application which claims priority under 35 U.S.C. Section 119 to U.S. Provisional patent application 60/773,372 entitled "On-Demand Software Service System and Method," filed Feb. 14, 2006. This application is herein expressly incorporated by reference in its entirety for all purposes.

TECHNICAL FIELD

The present invention relates generally to software of the type commonly required for many computer applications, such as operating systems, word processing, graphics, presentations, spreadsheets, email, calendaring, file storage and management, and the like, and is particularly concerned with a system for providing such software to users on an on-demand basis so that they can obtain software tailored to their specific business.

BACKGROUND OF THE INVENTION

The current software environment consists of a myriad of unrelated software applications which complement each other and sometimes overlap each other. Although there are integrated suites (like MS Office™), they are due more to the efforts of one company (Microsoft™) than the desires of the user community. The user community has reduced control of the features of each packaged software: although the user buys the software for a particular need or needs, most of the time the user ends up with additional features because of a belief that they might be needed in the future or just because the user does not have the option to exclude these features, due to the integrated suite packaging. This means that the user often pays more than is needed to obtain the applications they require. The result is an unnecessary bloated software and environment that drags the performance of the user computer and penalizes the user both financially and otherwise.

For a business, the result is the need to spend more in hardware (computers with more powerful CPU and more memory) to achieve efficiency that would be achievable with simpler applications tailored to the needs of the business. There is also a need to spend even more in software licenses and upgrades for features that the business or user does not need (or worse, does not know if it really needs them) and the increasing cost of complex management of licenses and upgrades. On top of that, the user's mobile devices (laptops, cell phones, Blackberry's, PDA's) add another dimension to the complexity of management besides adding the burden of keeping files in sync between the mobile and fixed devices.

The retail user and small business which do not possess specific IT groups to support them as does the big business suffer even more since the license price is much higher and most of the time they do not have the support to choose the best product and they do not have the attention from the software vendors that big corporations have.

What is instead needed is a system in which software is conveniently provided to users on-demand. Ideally, such a system would permit the user to access only that particular software that he or she needs, when he or she needs it.

SUMMARY OF THE INVENTION

It is an object of the present invention to provide a new and improved on-demand software access system and method for users so that users can readily select only the appropriate software applications from a network provider for their particular purposes on an on-demand basis.

According to one aspect of the present invention, an on-demand software and service access system is provided, which comprises a remote processing system or remote service provider accessible via the Internet or other network, and a local system which runs on a user's local device. The remote system has a plurality of different software applications, operating systems, and central data storage means for selective access by authorized users from their local computer via a network or the Internet, as well as support means for providing user registration, user login, user device configuration, and usage accounting, and the remote server and local system together provide the framework that enables the services to run on the user's computer. The system preferably provides for usage of the selected software applications on a rental or subscription basis for applications required by users on a daily basis, as well as on a one-time purchase basis, for one time use, for use only for a specific time period, or permanently. The remote system may be provided at one physical location or split between several different locations for different services and applications.

The system of this invention is divided into two parts, the remote system which may be running in one or more locations and the local system which is running on the user's local device. The local device may be a personal computer, laptop, personal digital assistant (PDA), cell phone with data communication capabilities, or the like. Once a user is first registered with the system, or registers a new device with the system, the system framework will be installed on the user's device. This framework includes the user settings and local services, a data manager for finding and storing data, a service connector for establishing connection between the local and remote system, a service locator for finding the service a user is requesting either in the local device or the remote system, and a service manager for receiving requests from the user and passing them on to the appropriate component.

The remote system can be hosted anywhere provided that the local system is able to access it. It can be running at one or more locations or even on one sole computer. The remote system will include similar components to the local system, as well as services and applications to be provided to the local system based on service request from the authorized user. The remote system can look up services to be obtained from a third party service provider if the service requested is an external service not available directly from the remote server or provider. The remote system will include a catalog of available services along with prices and payment modes, which can be looked up both by subscribers and by potential new subscribers.

The system of this invention allows on-demand lightweight applications with embedded application usage accounting. It may also integrate the application specific-menus under menus oriented to the user tasks, to make the applications easier to use, and integrate and organize the user data (documents, e-mail, appointments, notes, etc) under views that enable the user to visualize the data classified by pre-defined and system-generated categories or system-generated keywords. The system may also store user data (documents, e-mail, appointments, notes, etc) and user settings in a central location. Reliable storage may be provided through automated data backup in the central storage without user intervention. Fast access, temporary data can be stored in local storage on the local system.

The present invention may provide the user with the similar set of configuration, applications and data throughout several workstations and devices (PC, PDA, BlackBerry, cell phone) respecting the limits (memory, storage, processing power, screen area, input devices) of the device thus providing the user the same level of interaction seamlessly throughout the devices.

The use of on-demand lightweight applications built on top of the system will enable the users to have a better visibility of the application usage and application performance. The optional task-oriented menu will enable the user to focus on the task he/she needs to perform instead of the menu items provided by the applications thus eliminating the three-steps of: browsing through the menu items, looking at the help pages and selecting the correct sequence of application commands. With the integration and organization of the user data, several different types of data can be available to the user under one place instead of manually starting the applications and selecting the data from the different applications or directories. This combination will significantly improve user efficiency and the performance of the applications as well as helping the user to spend only on the items he/she uses, rather than having to purchase a predetermined integrated software suite which may include features not desired or required by the user, taking up unnecessary space on their system.

The present invention is truly an on-demand system. Users may subscribe to applications/services they use in a day-to-day basis. Optional additional features will be able to be purchased for a one time use, for a specific time or permanently. Standard software applications may be chopped to smaller functional units for improving performance and better maintenance. User usage of features can be monitored and accounted, therefore giving to the user/manager the visibility of the actual usage of the features the user subscribes to. After a user logs into the system, the user's local device will be configured with the user saved settings. This means that, in the same type of devices, the user will have the same environment settings and access to the same features (except for the device limitations like screen size). Among a user's different types of local devices, the local device configuration can be similar but not the same since the devices characteristics will vary (for example: devices like cell phones will have a much limited processing and storage power as well as screen size).

According to another aspect of the present invention, a method of providing software applications and services to local users on an on-demand basis is provided. This method may comprise the steps of: setting up a contract with a user to provide a user-selected menu of software applications and services from a remote server system onto a local system comprising one or more user devices on an on-demand basis; storing user data and user settings; and configuring the user's device with the user saved settings and applications.

The menu of services and software applications available to the user may include some or all of the following: on-demand lightweight software applications such as word processing, graphics, spreadsheets, multimedia presentations, email, calendar, secure storage of user files and access to the files using any computer connected to the internet via the web browser, reconfiguration of the user environment on the local user device to the latest saved user configuration, integrated menu, task-oriented menus, centralized storage of user e-mail, calendar and address book, and access to the calendar and address book via the internet, and main access menu with the services to which the user has access. These may be available only to registered users on a periodic or one-time payment basis, or a limited set of applications may be made available for free in return for the user accepting advertising banners.

The on-demand software application and service system and method of the present invention allows users to avoid paying for expensive software suites and licenses which may contain elements they do not require, and allows them to purchase or rent software applications on an as-needed basis, saving on purchase and license fees and also avoiding the need for more powerful computers and more memory. Memory and storage space is saved because a large integrated suite of software does not have to be installed and running on the local computer, and also because certain user data of a permanent nature can be stored remotely at a central storage location and downloaded as needed by the user over the internet.

BRIEF DESCRIPTION OF THE DRAWINGS

FIG. 1 is an illustration of the system of the present invention.

FIG. 2 is an illustration of an example of the topology of the present invention.

FIG. 3 is an illustration of the relationship between the components of the run-time system.

FIG. 4 is a screenshot of the login window.

FIG. 5 is a screenshot of the system after the user logs in.

FIG. 6 is a screenshot of the user service menu.

FIG. 7 is a screenshot of the resource explorer.

FIG. 8 is an illustration of data stores and their relationships.

FIG. 9 is a flowchart representing the first interaction of the user with the run-time system.

FIG. 10 is a flowchart representing detailed interaction of the user with the run-time system.

FIG. 11 is a flowchart representing the user login through a web browser.

FIG. 12 is a flowchart representing the user login through a run-time system form.

FIG. 13 is a flowchart representing login without connection to the remote system.

FIG. 14 is a flowchart representing login into the local system.

FIG. 15 is a flowchart representing local device registration.

FIG. 16 is a flowchart representing an initial service request.

FIG. 17 is a flowchart representing user interaction with the service.

FIG. 18 is a flowchart representing finding a service location.

FIG. 19 is a flowchart representing a local audit.

FIG. 20 is a flowchart representing a remote audit.

FIG. 21 is a flowchart representing data synchronization.

FIG. 22 is a flowchart representing document classification.

FIG. 23 is a flowchart representing event notification.

FIG. 24 is a flowchart representing re-connection to the remote system.

FIG. 25 is a flowchart representing a local system pre-load.

FIG. 26 is a flowchart representing third party user authentication.

DETAILED DESCRIPTION OF THE DRAWINGS

Part I—Definitions and Terminology

Resource—any file contained information that the user created, received, sent, used or stored. Resources can include (but are not limited to): Text documents like Word documents;

spreadsheets; e-mail; bookmarks to web sites; calendars; contact lists; personal journals; public journals/blogs; digital photographs; and digital music.

Resource Type—resources may be classified in types, with all the resources within a type sharing a common set of properties.

Resource Visibility—each resource can be private (visible to the user and a limited set of other users) or public (widely accessible). The group of authorized users who can access private resources and what they can do as well as with the public resources is defined by the user profile (see next) associated with the resource.

Confidential Resource—a resource which is private and must be subject to additional protection and may thus be encrypted so that even if anyone gets his/her hands on it, he/she will not be able to view it.

User—the person who accesses the system. Each user has one or more profiles.

User Profile—a set of rules which govern what the user can do. Exemplary user profiles may comprise, but are not limited to, the following: (1) a set of devices from where the user can access the system, wherein each of these devices may be divided between base-device (at minimum one) and satellite-device (zero or more); (2) a list of the types of resources that the user can view and/or manipulate; (3) a list of the preferred services to be used by the user when viewing and/or manipulating the allowable resource types; or (4) a set of rules establishing from where and when the resources can be accessed or manipulated.

Provider (or the Technology Service Provider)—a business entity responsible to assert the rules in the user profile and store the associated resources according to a pre-established contract (the SLA—Service Level Agreement).

Device—the hardware from where the user accesses the system.

Device Type—a device can be classified by criteria including, but not limited to, its processing power, memory speed and size, storage speed, size and type, Internet connection (bandwidth and level of service), and personal or multi-user usage.

User Session—user interaction with the system starting from the moment where he/she logs into the system and ending from the moment he/she logs out of the system or stays more than a pre-established time (like 15 minutes) without interacting with the system.

In exemplary aspects, the user session may comprise: (1) the user; (2) the profiles (i.e. the set of one or more profiles which dictates the rules of the session, optionally one profile can be prioritized upon another one); and (3) the device.

Restricted User Session—a user session started in a temporary device due to the unsafe nature of the device. Preferably, a restricted user session will only start the public space and it will provide only a limited set of features.

Part II—Exemplary Embodiments of the Present Invention (a) Introduction

FIG. 1 is an illustration of the components of the present invention. System 10 comprises a framework 20 and a service module (a.k.a. "business model") 30, as follows:

Framework 20 is the system that enables the on-demand lightweight applications/ features to run. It also provides auxiliary applications for the development, deployment and validation of on-demand lightweight applications. Framework 20 may optionally comprise some or all of: a run-time system 22, a development helper 24, a deployment helper 26, and a validation suite 28.

Run-time system 22 is a set of processes running on both the local device and on the remote system(s) (see FIG. 2). Run-time system 22 provides support services to the on-demand lightweight applications as well as other services like user registration, user login, device configuration, usage accounting. Run-time system 22 is the only required component of framework 20.

Development helper 24 is an application that eases the task of development of the on-demand lightweight applications. Deployment helper 26 is an application that eases the deployment of the on-demand lightweight applications. It runs on the remote system. Validation suite 28 is a set of validation tests to be performed on the on-demand lightweight application that ensures the compatibility with other applications thus ensuring the interaction between them. It runs on the remote system.

It is to be understood that development helper 24, deployment helper 26 and validation suite 28 are optional aspects of the invention, and are only necessary for the IT group that will develop, deploy or validate the on-demand lightweight applications.

Service module 30 is the business model or system that enables an end user to leverage the hardware or software based framework 20. Service module 30 is provided by a Technology Service Provider (TSP) company. One or more TSPs may manage framework 20 run-time system 10 on behalf of the user in exchange for a fee.

In one exemplary aspect, service module 30 provides a direct contract between the user and the TSP. For example, the user pays a fixed monthly fee in exchange of some or all of the following services or a subset of services, including, but not limited to: (1) secure storage of the user files; (2) daily automatic backup and on-demand recovery of user files stored in the TSP central repository; (3) optional versioning of the user text files stored in the TSP central repository enabling the user to rollback changes in the file; (4) indexing of the user documents following pre-determined categories and/or rules allowing the user to easily search and retrieve them; (5) access to the user files from any computer connected to the internet using the web browser; (6) reconfiguration of the user environment in the local device to the latest saved user configuration (independent of the device & preferably only available to the registered devices); (7) integrated menu; (8) task-oriented menus; (9) access to user e-mails; (10) redirection of user e-mail; (11) centralized storage of user e-mail; (12) centralized user calendar and access from the internet; (13) centralized address book and ubiquitous access from the internet or integrated access from the registered devices; (14) notifications from the user calendar to the devices registered in the contract; (15) main access menu with the services to which the user has access (only available to the devices registered in the contract); (16) view, create and edit text documents; (17) view, create and edit different graphics documents; (18) view, create and edit spreadsheets; (19) view, create and edit presentations and other multimedia documents; (20) view, create and edit mixed documents (like text with graphics, spreadsheets with charts, etc.).

A TSP may alternatively or additionally offer a limited set of features for free provided that the user accepts the advertising banners. In this case the advertisers are sponsoring the features in exchange of attention and probably business transactions.

In addition to paying a fixed monthly fee for selected services and software, a user may optionally alternatively purchase services and software on a one-time basis, for example for services and software which they need only on a temporary basis, as will be described in more detail below. The user may register multiple devices for access to the system. The list of the devices that the user can register includes home personal computers, data enabled cell phones and Personal Digital Assistants (PDA's).

In another alternative aspect, the user has a direct contract with its TSP and the company where the user works with has another (different) contract with another TSP. In this case, the user can combine the two subscriptions (profiles) for use in his/her home computer. However, for security reasons, the company's file access could be disabled or can have limited access. Therefore, the user would be able to access his personal e-mails as well as the company's e-mails from the home computer.

In optional preferred aspects, the present invention may offer some or all of the following services independent of the TSP: (1) a resource explorer (i.e.: one or more views of the user resources available in the session); (2) a notification service (that provides to the user notification about events or arrival of messages or e-mail); and (3) a finder service (i.e.: a search engine which searches through the user resources).

(b) User Profile:

The User Profile is chosen by the user (or his/her sponsor) when the contract is established. It is a process similar to the cell phone plan when the user chooses one of the several packages available plus the additional optional item he/she wants. In the case of a sponsor, the package is chosen according to the user relationship with the sponsor (like his/her position in the company, in case the sponsor is the employer).

The User Profile contains a set of rules which will be applied when the user establishes the session (when the user logs into the system). Such rules may govern, but are not limited to governing, the following examples:

(1) The interaction of the user profile with other profiles the user can have, for instance the user profile with his/her employer and the personal user profile.

The rules may specify if the profiles should merge or not and in which level they can be merged (total merge, merge only public resources). A user profile as student of a school can specify that it can be totally merged into the student profiles so that the student can access all of his/her resources from the school and all the services available at the school in his/her personal home computer (running his/her personal profile). At the same time, an employer for security reasons can forbid his/her employee to merge the company profile with any other profile and in addition to that can specify the computers outside the company from where the user can access the company profile. The profiles are preferably only merged if both profile enable the merge and the most restrictive merge will apply.

(2) The number of devices from where the user can access the profile and the type of device and the list of available services. For example, (i) the maximum storage size for remotely storing the user resources; (ii) the type of resources that can be manipulated by the services available to the users; (iii) additional services available to the user; (iv) resource sharing policy—for example, no sharing outside the company or sharing only public resources or sharing with members of groups created by the user (like the user family or the user friends); (v) the size of the storage for public sites/blogs/communities; (vi) the features available for the public site (like database server, e-commerce, credit card validation, etc); (viii) the number of e-mails, where the e-mails will be collected at the local device level or at the server level. If collected at the local device level, the e-mails may be available first at the local device then at the server and distributed to the other devices then if the local device is not receiving e-mails, they will not be collected. If collected at the server, the e-mails will be available at all the devices almost immediately after they are sent; (ix) the services and types of synchronization available at devices (like cell phones) where the network bandwidth is expensive.

(c) The Service Contract:

In preferred aspects, a service contract is formed between the user of the local device and the operator of the remote system. Preferably, this service contract or "Service Level Agreement" (SLA) is provided between the two counterparties, and can be two Services or an end-User and a Service. As described herein, the caller of a service is as "service-user" (who can be an end-user or another service provider) and the called service is a "service-provider". The SLA is the minimum level of quality that the service-provider will guarantee to the service-user. If the service-provider fails to meet the pre-established level of quality, penalties established in the contract can be applied.

Besides the Quality of Service, the other characteristics of the Service Contract may include, but are not limited to, (1) a usage counter; (2) a payment method; (3) storage space; and (4) penalties, further described below.

The Usage Counter specifies how the usage of the service will be accounted for payment purposes. This may be done as: (1) per request—the number of service access by the service-user is used as counter; or (2) per period—the period from the time the service is called for the first time to the time the service-user ends the service use. The finish time can be established as the time the service-user sends an end of service message/command and/or the after a pre-determined period of inactivity time. A per request counter is used in most of the cases. For example, a contract can establish the maximum number of requests per month to an service. A per period counter will be probably best for very interactive services like a document editor.

The Payment method can optionally include one of the following payment types: (1) fixed monthly fee—a maximum limit on the counter is established for a fixed monthly fee; or (2) a pay-per-use fee—a fee is established for a counter measurement (like a U$0.01 for each Calendar notification request).

The Service Contract can establish a maximum storage space to store the results of the service interaction or the limit of the user overall maximum storage space can be used.

Penalties can be established for the violation of the contract term. Penalties can range from credit for the next payment to actual payment of the penalty.

The quality of service (QOS) can also be defined in the Service Contract. For example, the quality of the service can be measured (but not limited to) the following metrics: (1) the maximum number of failures per period; (2) the maximum allowable response time; (3) the maximum average response time; and (4) the maximum number of requests per period.

A Combined Service Contract can also be provided wherein, instead of having one service contract for each service-user/service-provider call, only one service contract can be agreed upon combining all the service-user/service-provider iterations.

(d) Lightweight On-demand Service Categories:

In various aspects of the invention, framework 20 may offer the following four categories of services:

1. Stand-alone Hosted Local Service—this service would be hosted by the Local System and thus would not require any Service running in the Remote System and therefore it does not need to communicate with the Remote System.
2. Hosted Distributed Service—this service would be partly hosted by the Local System and partly hosted in the Remote System and therefore would only communicate with the Remote System from time to time.
3. Stand-alone Local Service—this service/application would access some services hosted by the Local System but would not require access to any service in the Remote System. For example: legacy applications that access one or more local services.
4. Distributed Service—this service/application would accesses at least one service in the Remote System (in addition, it could access one or more services hosted by the Local System). For example: legacy applications that access one or more remote services.
5. Web-based Service—this service/application would use the local Web Browser to fire services in the Remote System. The only difference is that it will be using the login data given at the login time. In case the user is not logged in, the login web page will appear.

(e) The User Services Menu:

In preferred aspects, a User Services Menu is displayed to an authorized user after (s)he successfully logs in. The User Services Menu may contain all the services accessible to the user at that moment and it is determined by the User Profile associated with the session. In preferred aspects, the user can re-arrange and remove services from the menu. Removing the services from the menu does not mean that the user can not use it. Instead, the user needs to explicitly unsubscribe from the service. The User Services Menu preferably can also be moved, re-sized, minimized and maximized.

The User Service Menu configuration is part of the User Profile. Therefore for the same class of devices, the User Service Menu could have the same configuration. For instance, if the user has configured the User Service Menu in his computer in the office, in his laptop the User Service Menu will have the same configuration. This results in the same look and feel, the same items and same behavior on both devices.

In addition to the User Service Menu, other menus can be displayed on the local device, including, but not limited to: (1) Service Specific Menus which are associated with the document being viewed or edited and the service that enables the viewing or editing of the document (Optionally, they are displayed only when the document gets the focus of the user, i.e., when the user selects to work on the associated document); and (2) User Defined Sub-Menus which are menus defined by the user. An example of a User Defined Sub-Menu would be a Native Menu managed by the Local Device (like the Windows Start menu, the cell phone menu, and the like).

(f) User Interaction With Lightweight On-demand Services:

In preferred aspects, Stand-alone Hosted Local Service (a.k.a. "Category I") and Hosted Distributed Services (a.k.a. "Category II") are accessible by the user through the User Services Menu. Stand-alone Local Service (a.k.a. "Category III") and Distributed Service (a.k.a. "Category IV") may be accessible by the user through the interface provided by those services which can be short-cuts in the desktop, native menu, quick launch toolbar, and the like. Other services can be accessible by the user through the Web Browser.

(g) Local Device Categories:

The local system (or local run-time system) is the system running on the device that receives input from the user.

Various different types of local devices can be used. For example, the local device from where the user accesses the system can include any of: connected computers; mobile computers, limited connected devices, and limited roaming devices.

As understood herein, connected computers are personal computers that are always connected to a network. According to their processing and storage level, they can be sub-classified as: (1) powerful—computers that have large amount of memory, great processing power and large storage. Due to the technological advances the corresponding numbers can vary, current numbers can be: more than 1 GB of Ram Memory, Pentium 4 with more than 2.0 GHz of speed, local hard-disk with size greater than 120 GB; (2) medium—computers that have reasonable amount of memory, processing power and storage. Due to the technological advances the corresponding numbers can vary, current numbers can be: between 512 MB and 1 GB of Ram Memory, Pentium 4 with less than 2.0 GHz of speed, local hard-disk with size between 60 GB and 120 GB; and (3) limited—computers have limited amount of memory, processing power and storage, normally they run old Operating Systems. Due to the technological advances the corresponding numbers can vary, current numbers can be: less than 512 MB of Ram Memory, Pentium 3 or older computer, local hard-disk with size smaller than 60 GB.

Connected computers can also be classified according to the connection level as: (1) high bandwidth connection—computers with connection speeds greater than 225 Kbs. For example: computers with broadband connection; and (2) low bandwidth connection-computers with connection speeds lower than 225 Kbs. For example: computers with modem connections.

Mobile computers comprise computers that are not always connected like laptops, tablet computers. They can have the same classification in powerful, medium and limited as above but with different numbers. The same connection classification (high bandwidth and low bandwidth) applies to them as well.

A limited connected device comprises devices that are always connected to a network. They have limited power and lower bandwidth connections.

A limited roaming device comprises devices that are not always connected to a network. They also have limited power and lower bandwidth connections.

In addition, local devices can be divided between multi-user and personal devices. Multi-user devices accommodate more than one locally registered user like PC's. In contrast, Personal devices are tied to one user like data-enabled cell phones or PDA's (Personal Digital Assistants).

(h) Devices and the User Profile:

Each User Profile will optionally contain the list of devices from where the user can connect to. This number may be divided between Base Devices and Satellite Devices.

Base Devices are devices where the user spends most of his/her time working and contain most of his/her local resources, it is from the Base Devices that the system will load his/her resources for the first time. In general, the Base Device is the most powerful device the user utilizes in a regular basis. Even though it does not mean it is a powerful device like a connected device, it could be a data-enabled cell phone for those who do not have a computer to be used in a regular basis.

Satellite Devices do not have all the user resources due to their limitations or their temporary usage. For example, a data-enabled cell phone is a satellite device. Some users can have only satellite devices for instance, users without computers at home they can still access and create resources in the satellite devices like the cell phone or PDA and synchronize them either over the air (OTA) or using a temporary computer as a proxy.

Temporary Devices are devices used in a once in a lifetime basis (like Internet cafes terminals) and should not have user resources stored locally. There is no limit on the number of the Temporary Devices from where the user can access the system. In the temporary device the interaction with the system is through the web browser and for security reasons additional information (besides the user name and password) will be required to login (like the user private key stored in a USB flash drive device).

Part III—The Run-time System (a) Description:

As understood herein, the "run-time system" is the software or hardware or firmware that is running in each of the local device 40 and the remote system 50. As such, the run-time system can be divided in two parts: the local run-time system (or local system) which is running on the device which receives the input from the user and the remote run-time system (or remote system) which can be running in one or more locations. A configured connection between the local and remote systems is assumed.

FIG. 2 shows an example of the topology of the present invention. As seen in FIG. 2, two local devices are presented, being the user PC 42, and the user laptop 44. Devices 42 and 44 are both connected to remote system 50 by the internet. As long as devices 42 and 44 are registered with the Technology Service Provider, the end-user can use any one of them to use the present invention.

In accordance with the invention, the first time local system 40 connects to the Internet, local system 40 will try to synchronize the data (transmit the new data and the new changes and receive the new data/changes from the remote system 50) and update the local services.

In the case of local systems that are not always connected to the Internet (like a laptop which can be in a place where no Internet connection is available), when no Internet connection is available, local system 40 could function instead in a "stand-alone mode" working with a local copy of the services and files and storing the data locally in the laptop storage.

In preferred aspects, remote system 50 in this example consists of a collection of machines (servers) 52 arranged in cluster configuration, with this clustering of servers 52 being used for the processing of the requests coming from the local systems. Such clustering of servers 52 adds additional robustness to the solution providing alternate paths in case of failure of one of its servers. Independent of the number of servers 52, the local system 40 will see only one server. A central storage in this case consists of a file storage 54 for the file storage (which can be either a Network Attached Storage—which is a set of disks connected to the internal network and available to any of the servers in the Clustering—or a storage area network—a set of disks connected to some of the servers through a high-speed connection like a fiber optical channel) and a database server 54b for the database.

In addition, a remote server 500 is depicted to illustrate the fact that remote system 50 can also respond to another remote system (not shown) call for service.

(b) The Local System 40:

As seen in more detail in FIG. 3, local system 40 may be comprised of some or all of the following elements (which can be in different processes or in the same depending on the local device capabilities): (1) a profile manager 41; (2) a service locator 43; (3) an auditor 45; (4) a data manager 46; (5) a service connector. 47; (6) a notification agent 48; and (7) a service manager 49.

Profile manager 41 may perform some or all of the following tasks: (1) load the user profile to the device; (2) validate the local user profile with the user profile store in the remote server; (3) validate if the local device is in the user allowed device list; (4) load the user settings; (5) load the user local services using the user profile and the device profile; and (6) upgrade user services adding more services to his profile.

Service locator 43 operates to find the service that the user is requesting from either the local device or the remote server as well as to validate the user's access to the requested service (with collaboration of the profile manager).

Auditor 45 collects information about the local services the user uses and the metrics (response time and number of errors and attempts) for each user interaction. Those metrics can be sent to the auditor in the remote system.

Data manager 46 finds and stores data. The data may be divided in two types: (1) run-time data (fast access, temporary data), and (2) persistent data (slow access, permanent data). Depending on the type of data request, one of the following available data storage types may be used: local memory, shared memory, local storage, central storage. The preferred storage for persistent data would be central storage, but connection bandwidth and connection status can prevent the data manager to send data to the central storage thus delaying to a later time when connection is available and connection bandwidth is acceptable.

Service connector 47 performs all the service communication. Specifically, it establishes the connection between two services (40 and 50) and sends to auditor 55 all the information concerning the quality of the service provided. Service connector 47 negotiates the service quality and provides proven data of the actual level of service quality offered by the service. Service connector 47 optionally uses a proprietary protocol that ensures that the service level data like response time and downtime is accounted properly.

Notification agent 48 receives notifications from Remote System 50 and sends them to Service Manager 49. Service Manager 49 manages the interaction between those components, and is the responsible to receive the requests from the user and pass them to the appropriate component. Service Manager 49 also communicates with the local device's (42 or 44) operating system.

Service Manager 49 provides the User Services Menu and the Resource Explorer (with collaboration with the Data Manager) that appears on the local device. Service Manager 49 may optionally build the User Services Menu to the user after he/she, logs in successfully according to the Services that the user can access. Additional services can be added to menu when the user subscribes to them. For devices with the same category, the User Services Menu can be displayed the same and they will contain the same items. The Resource Explorer can optionally present the user data categorized by pre-defined and system-generated categories or system-generated keywords.

All of the components of local system 40 and remote system 50 together comprise framework 20 FIG. 1). Framework 20 may also include development and deployment helpers which will ease the development and deployment of services by third-party providers since it will free them of implementing the inner details of the validating user and device profile and locating and communicating with other services as well as persisting data and retrieving and changing shared data. Also as part of Framework 20, an optional validation suite application may ensure application compatibility with other applications and with the several devices that it can be deployed.

Preferably, local system 40 can be run in any portable computer (Windows based or MacOSX based), PDA, cell phone with data communication capabilities or other devices capable of hosting programs and sending/receiving data. However, local system 40 can also be run in a remote server, as in the case where it acts as a proxy for another local device (as in the case of the web browser running in a local PC connecting to the web server in the remote server) or as a service provider for another service for complex tasks (like financial, engineering or graphic simulations running on behalf of another service request).

Optionally, local device 42 or 44 can act as proxy for other local devices such as when home computer 42 is used as proxy for the cell phone (or PDA). In this case, the home computer 42 will communicate with remote system 50, thus using the home computer's connection to remote system 50 (and the home computer local system will intermediate the connection between the cell phone/PDA and the remote system). This is advantageous since the cell phone/PDA connection to the home computer is very fast (through a USB or Firewire cable) and the pass-through connection from the cell phone/PDA to the remote system is much faster than the direct connection from the cell phone/PDA to the remote system. Another advantage is that the pass through connection does not pass through the cell phone provider network, saving bandwidth and a special connection service fee from the cell phone provider.

In multi-user local devices, the user can log in, and three spaces can be created: (1) public space, (2) private space and (3) the DMZ (De-Militarized Zone) space. Public resources will be placed in the public space and private resources in the private space. The DMZ space is used to disinfect resources going from public space to private space and to enforce additional checks when the resource is transferred from private to public spaces.

(c) The Remote System 50:

Remote system 50 can be hosted anywhere provided that local system 40 is able to access it. Therefore, remote system 50 can be running on (but not limited to) one location or even one sole computer. Remote system 50 may comprise counterparts of the components of the local system. These counterparts may service the requests of the corresponding local components. The service provider database and the service provider file system may be the central repository for the user data. They can be centralized (for a small system) or distributed. Indexing can also be done by subject(s) for each user. One document/set of data can belong to more than one subject. The documents can be automatically indexed (through the title and a series of keywords) and the indexes stored in the database thus facilitating retrieval.

In preferred aspects of system operation, the inner workings of remote system 50 and the communication between the components in local system 40 and remote system 50 are shielded from the users and the developers.

Remote system 50 may optionally include some or all of the following counterparts of the local system components: (1) profile manager 51; (2) service locator 53; (3) auditor 55; (4) data manager 56; (5) service connector 57; and (6) notification manager 58.

Profile manager 51 receives the requests from profile manager 41 (in the local system) and looks up user and its associated profile data querying the entries in the "User Profile" storage (database element). The "User Profile" element may contain data about the user, his/her plan (which is the set of services/local systems that he/she is entitled to use).

Through the queries to the "User Profile" database element, profile manager 51 will be able to fulfill the requests from the sibling local system component (i.e.: profile manager 41). In preferred aspects, profile manager 51 may: (1) return the user profile for local device 42 or 44 associated with local system 40; (2) validate if the local device 42 or 44 is registered to the user in his/her list of allowed devices; (3) return the user settings for local device 42 or 44; and (4) update the user profile when various services and/or local system devices 42 or 44 are added, changed or removed from the user.

As requested by the local system sibling (i.e.: service locator 43), service locator 53 will look up the service in remote system 50 (or in a third-party service provider server 500 if it is an external service), validate the user access to remote system 50 and pass the reference to the found service back to local system 40. In order to achieve this, the service lookup preferably uses a "Service Catalog" database element and the user validation uses the "User Profile" database element.

The reference returned by service locator 53 to service locator 43 may be sent by service connector 47. Thus, service connector 57 will receive the request with the reference to the actual service to be called, and then it will intermediate the conversation between the local system components and the actual service. Service connector 57 can use auditor 55 to save the metrics of the request.

In preferred aspects, a catalog and metrics of available services will be kept in remote system 50 (FIG. 2), available to all the users (even the ones who do not use/subscribe to the service) with a minimum delay. When a user is shopping for a new service, system 10 will provide a list of available services with the current metrics (like average and worst response time, average and worst throughput, current number of subscribers) and the price for different payment modes (per minute of usage, as part of the monthly subscription).

Auditor 55 updates these metrics. This can be handled asynchronously so that it will try to have minimal impact on the actual response time. When requested by auditor 45, auditor 55 will update the statistics of the services running in local system 40 in a Service Metrics database.

Remote system auditor 55 can also be requested by service connector 57. In this case, auditor 55 will store the metrics of a service in remote system 50 or in a third-party service provider. In addition to these components, an accounting component 59 will account the use and counting of the payment share for each third-party service provider and for the other service providers according to the pre-established Service Level Agreement.

Data manager 56 handles the storing and retrieving of requests from data manager 46. Data manager 56 can also compare the date and modification of the data cached in local system 40 with the dates and data stored in the User Data database thus establishing the data that needs to be changed in local system 40 and in the User Data database.

Notification manager 58 processes the monitored events, sending them to be processing and sending the notification event data to the local system notification agent component. Notification manager 58 may comprise two sub-components: (1) the event dispatcher; and (2) the event processor. The event dispatcher receives event data and dispatches it to the appropriate event processor. The event processor can take an action based on the actions assigned to that event in the Event Map database.

The Central Storage 54 may include a File Server (using SAN or NAS as in FIG. 1) or database servers . Preferably, only data manager 56 and profile manager 51 are run in the public space. Therefore, sessions without private space will be able to run only these components.

(d) The Connection between the Local and Remote Systems:

Preferably, the system is a network that is agnostic such that messages can be sent and received from and to local device 42 or 44 to remote service 50.

The conduit between the local and remote system in the exemplary embodiment of the invention may be through HTTP or HTTPS over TCP/IP (used in the internet connections). Special devices and special networks (like data-capable cell phones) may need customized solutions, but the actual inner working can be shielded from the end used and the developer. On top of the http or https protocols, a SOAP web services protocol will be used at the application/component level.

(e) User Interaction with the System:

FIG. 4 is a screenshot of the Login window. When the user tries to use the system for the first time (provided that he/she had registered himself/herself and the current device) the window illustrated in FIG. 4 can be presented. After the user successfully logs in (filling the correct user name and password in the screen above and clicking on the Login button), the User Service Menu and the Resource Explorer (FIG. 5) can be presented.

FIG. 5 is a screenshot of the system after login. FIG. 5 illustrates the User Service Menu 60 and the Resource Explorer Window 62. User Service Menu 60 is like a standard Windows menu, except for the different menu item names. The exception is that instead of the standard Windows menu items (like File, Edit, View, Insert, Tools, Windows, Help) it will be task driven with items like: Redo Recent tasks, Open Recent Files, Compress and send documents by e-mail, Notify me when his/her e-mail reply comes, etc. The list of tasks to be provided on user service menu 60 can be selected from the list available on the Service Provider.

FIG. 6 shows an example of a user service menu 64 with additional options. User service menu 64 preferably contains menu items found in services categories I and II (see definition in Lightweight On-Demand Service Categories above) so that these services will be accessible through this menu.

Preferably, User Service Menu 64 can be customized by the user. As such, The user will be able to change the organization of the menu and the items in the menu as well as add shortcuts, changing icons, changing look and feel, and the like. The customization is propagated to any other PC/workstation the user will be using to access the service provider.

The exchange of user-created tasks between the users will be encouraged and enabled through posting tasks in a "market" of tasks (with ratings and comments placed by users themselves).

The user interaction starts with the user choosing the on-demand service (or one of the service tasks) from user service menu 64. From that moment on, the interaction is specific to the chosen service.

FIG. 7 illustrates a Resource Explorer window 66. The User Profile associated with the session determines the list of services available to the user (and listed in the User Service Menu). One of the basic services available to all the users would be Resource explorer 66. Resource explorer 66 is similar to a Windows Explorer with the menu, the left panel for navigation, the upper right panel to display the contents of the item selected in the navigation panel at left and the bottom right panel displaying the contents of the item selected in the upper left panel. As illustrated in FIG. 7, Meetings category (sub-category of Patent Application) was selected on the left navigation panel, and in the top right the appointment "San Diego Meeting" was chosen and its contents are shown in the bottom right panel. As can be seen, a category can be presented in more than one place (but it will still be the same, i.e. contain the same items).

In addition to appointments and notes, resource explorer 66 may hold other types of files like: documents (MS Word document types), e-mails, reminders, birthdays, anniversaries, contacts, tasks, spreadsheets, graphics files, presentation files, pictures, videos, music files, archives (zip files), web site bookmarks, and the like.

Preferably, resource explorer window 66 will be highly customizable. For example, the user could be able to remove one of the panels, add more items to the menu, add columns to the list of contents (like Modified Date or From—for e-mails), remove one or more file types from the view list (like show only e-mails or show everything except archive files and web site bookmarks) or change the look and feel of the window (changing the colors, text font sizes and types).

(f) Security of the system and the user resources:

Preferably, precautions will be taken to secure the integrity of the user resources, including, but not limited to: (1) in addition to the password chosen by the user, a set of private and public key will be generated by the system and sent to the user (private key will be encrypted by the user password); (2) Log in using a temporary device will use two pieces of secret information: the password and either the private key or secret and personal information registered by the user; (3) the private user resources will never be sent to a temporary device; (4) when using a multi-user local device, the user resources will be protected against the other users of the local device; (5) when resources are classified as confidential, they are encrypted using the user public key; and (6) resource synchronization of private resource can only take place in the private space.

(g) Data Storage Components:

FIG. 8 depicts the data stores and their relationships. Each data store can be either an isolated database schema or part of the same database schema or even another type of structured storage like an active directory system (which can be used for User Provisioning). It is important that they can relate to each other in some way and they can provide support for the corresponding remote services. The TSP billing system is a separate third-party system chosen by the TSP to handle its billing and it is not covered by this patent.

As seen in FIG. 8, the system may include:

User Provisioning Data Store 70—it is the data store where all the users registered in the TSP is stored along with his/her information (user name, address, password, billing information, etc).

Content Management Data Store 72—it is the data store which holds the user resources and their associated types, categories, classification, accessibility information, confidentiality information and versioning (for some types).

User Session Management Data Store 73—it holds the data pertinent to the current sessions in the TSP.

Service Data Store 74—it contains all the services available to the users in this TSP and their information (location, quality of service, etc).

Notification Data Store 76—it contains information about the notifications being sent by the TSP.

TSP Audit Data Store 78—it contains the statistics about the services and all the usage metrics of the TSP users.

TSP Service Contract Data Store 79—it holds the service contracts for all the users in the TSP as well as all the pre-defined standard service package offered by this TSP.

Part IV—Flowchart Examples of System Operation (a) Introduction:

Below are flowcharts describing the inner workings of the present invention when a service is chosen from the User Service Menu. Also provided is one example of what will happen between the user and the service. Below are illustrations of what happens behind the scenes of each user interaction with the run-time system.

(b) User Registration Scenario:

The flowchart of FIGS. 9 and 10 represents the first interaction of the user with the run-time system. If the user is registered with his/her TSP through an affiliated company (like the student of a university or the employee of a corporation), the affiliated company has already registered the user (in a pre-registration phase). The series of events described below take place when the user registers himself/herself as an individual (for example for home/personal use). When the user instead registers with his/her Technology Service Provider (TSP), it is required that his/her PC/laptop or another device (the Local System) is connected to the Internet.

FIGS. 9 and 10 illustrate the situation where the user is not registered at all with the TSP and the Local Device was never used to access TSP remote system (i.e. the local run-time system is not installed), as follows:

Referring first to FIG. 9, the following sequence of steps happens:

1. The user accesses the web site of his/her Technology Service Provider through a web browser.
2. The user starts the registration going to the Registration Page (which is accessible through a web link in the Technology Service Provider web page).
3. The user fills the registration form with his/her personal data (name and address) and affiliation (if the affiliated college/university/company is going to pay for him/her) and the services that he/she wants to subscribe to and at the end clicks on the submit button.
4. When the user submits the registration form through the Registration Page, the registration information is sent to the TSP web server which in turn sends the data to profile manager 51 component in remote system 50.
5. The TSP checks the registration data against the User Profile database. This may be done by trying to retrieve all the users with the same registration data (same name and/or identification like the tax identification—Social Security Number—and address/phone number and affiliated company if given). For each retrieved user, the system will attach the associated data from the User Profile Database and User Data database especially the affiliated company if any.
6. Profile Manager 51 checks if at least one record was returned. In the case, no record will be found:
   a. The flow continues with Flowchart 2 (See FIG. 10).

The following numbers refer to the legends in Flowchart 2 of FIG. 10:

1. Even though no records by the user were found, Profile Manager 51 tries to find the user registration with another affiliated company. In this case no record with another affiliated company is found therefore it proceeds to step 7.
2. The user payment is validated (charge of the credit card or debit from bank account or any other types of payments). Assuming that all the payment data is fine, the system proceeds to step 8.
3. A new record for the user is created in the User Profile Database and the user data is stored in the User Profile Database and User Data Database.
4. Profile manager 51 also checks to see if the local system device 42 or 44 is already registered with the TSP, assuming local device 42 or 44 has never being used by anybody using the TSP, the system proceeds to step 10*b*.

10*b*. Profile manager 51 in remote system 50 will send back the user profile with the user id and the session token and the installation files for local run-time system 40.

11*b*. In Local device 42 or 44, the web browser will download the installation files for framework 20 with the User Profile data and ask the user to install the local run-time system. When the user accepts, the installation will start.

12*b*. The user is then registered in the local run-time system and his/her information is stored in the Local System Cache.

13. The user session is started using the session token received from the remote system (for more details see "Local User Login Sub-Scenario", herein).

FIGS. 9 and 10 also illustrate the situation in which the user is not registered at all with the TSP but local device 42 or 44 was already used to access TSP remote system (local run-time system is already installed), as follows:

Referring first to FIG. 9, the following sequence of steps happens:

1. The user accesses the web site of his/her TSP through a web browser.
2. The user starts the registration going to the Registration Page (which is accessible through a web link in the Technology Service Provider web page).
3. The user fills the registration form with his/her personal data (name and address) and affiliation (if the affiliated college/university/company is going to pay for him/her) and the services that he/she wants to subscribe to and at the end clicks on the submit button.
4. When the user submits the registration form through the Registration Page, the registration information is sent to the TSP web server which in turn sends the data to the Profile Manager component in the Remote System.
5. The TSP checks the registration data against the User Profile database. It tries to retrieve all the users with the same registration data (same name and/or identification like the tax identification—Social Security Number—and address/phone number and affiliated company if given). For each retrieved user, the system will attach the associated data from the User Profile Database and User Data database especially the affiliated company if any.
6. Profile Manager 51 checks if at least one record was returned. In the case no record will be found:
   6*a*. The flow continues with Flowchart 2 (See FIG. 9).

The following numbers refer to the legends in Flowchart 2 (of FIG. 10):

1. Even though no records by the user were found, profile manager 51 tries to find the user registration with another affiliated company. In this case no record with another affiliated company is found the system proceeds to step 7 (in FIG. 8).
2. The User payment is validated (charge of the Credit Card or debit from Bank account or any other types of payments). Assuming that all the payment data is fine, the system proceeds to step 8.
3. A new record for the user is created in the User Profile Database and the user data is stored in the User Profile Database and User Data Database.
4. Profile Manager 51 also checks to see if local system device 42 or 44 is already registered with the TSP. Assuming that the local run-time system is already installed, the system proceeds to step 10*a*.

10a. Profile Manager 51 in Remote system 50 checks the version of Framework 20 in local system 40 and compare with the latest version. If they match, the system proceeds to step 11a.

11a. The User Profile data, the new user id and the user session token are sent back to the web browser.

12a. The User is registered in the local run-time system and his/her information is stored in the Local System Cache.

13. The user session is started using the session token received from remote system 50 (for more details see "Local User Login Sub-scenario" herein).

FIGS. 9 and 10 also illustrate the situation in which the user is not registered at all with the TSP and local system 40 in local device 42 or 44 is not the latest version, as follows:

Referring first to FIG. 9, the following sequence of steps happens:

1. The user access the web site of his/her Technology Service Provider through a web browser.
2. The user starts the registration going to the Registration Page (which is accessible through a web link in the Technology Service Provider web page)
3. The user fills the registration form with his/her personal data (name and address) and affiliation (if the affiliated college/university/company is going to pay for him/her) and the services that he/she wants to subscribe to and at the end clicks on the submit button.
4. When the user submits the registration form through the Registration Page, the registration information is sent to the TSP web server which in turn sends the data to Profile Manager 51.
5. The TSP checks the registration data against the User Profile database. The TSP may try to retrieve all the users with the same registration data (same name and/or identification like the tax identification—Social Security Number—and address/phone number and affiliated company if given). For each retrieved user, the TSP can attach the associated data from the User Profile Database and User Data database especially the affiliated company if any.
6. Profile manager 51 checks if at least one record was returned. In the situation where no record is found:
    6a. The flow continues with Flowchart 2 (of FIG. 10)

The following numbers refer to the legends in Flowchart 2:

1. Even though no records by the user were found, profile manager 51 tries to find the user registration with another affiliated company. In this case no record with another affiliated company is found the system proceeds to step 7
2. The user payment is validated (charge of the Credit Card or debit from Bank account or any other types of payments). Assuming that all the payment data is fine, the system proceeds to step 8.
3. A new record for the user is created in the User Profile Database and the user data is stored in the User Profile Database and User Data Database.
4. Profile manager 51 also checks to see if the local system device is already registered with the TSP. Assuming that the Local Run-time System is already installed, the system proceeds to step 10a.

10a. Profile manager 51 in remote system 50 will check the version of framework 20 in local system 40 and compare with the latest version. If they do not match, the system will proceed to 11c.

11c. The local system upgrade files, user profile data, the new user id and the user session token are sent back to the web browser.

12c. After the user accepts to the download of the installation files for the version upgrade, the upgrade of the local system is started. When finished, the user is registered in the local run-time system and his/her information is stored in the Local System Cache.

13. The user session is started using the session token received from the remote system (for more details see "Local User Login Sub-scenario" herein).

FIGS. 9 and 10 also illustrate the situation in which the user is registered at with the TSP but through another affiliated company; as follows:

Referring first to FIG. 9, the following sequence of steps happens:

1. The user accesses the web site of his/her TSP through a web browser.
2. The user starts the registration going to the Registration Page (which is accessible through a web link in the Technology Service Provider web page).
3. The user fills the registration form with his/her personal data (name and address) and affiliation (if the affiliated college/university/company is going to pay for him/her) and the services that he/she wants to subscribe to and at the end clicks on the submit button.
4. When the user submits the registration form through the Registration Page, the registration information is sent to the TSP web server which in turn sends the data to Profile Manager 51.
5. The TSP checks the registration data against the User Profile database. The TSP may try to retrieve all the users with the same registration data (same name and/or identification like the tax identification—Social Security Number—and address/phone number and affiliated company if given). For each retrieved user, the system may attach the associated data from the User Profile Database and User Data database especially the affiliated company if any.
6. The Profile Manager checks if at least one record was returned. In the situation where no record is found:
    a. The flow continues with Flowchart 2 (See FIG. 10).

The following numbers refer to the legends in Flowchart 2:

1. Even though no records for the user were found, profile manager 51 may try to find the user registration with another affiliated company.
2. A user record may be found with another affiliated company. The list of the affiliated companies is then validated as follows:
    a. If the affiliated company policy does not allow sharing of configuration it is removed from the list.
    b. If the affiliated company policy does not allow sharing of configuration in the local device it is removed from the list.
3. Remote system 50 re-directs the web browser to the web page where it asks the user if he/she wants to use one of the configurations used in one of the affiliated companies.
4. The user decides which configuration (if any) and submit the answer.
5. Remote system 50 checks the answer from the user.
6. In case the user selected one of the configurations stored with one of the affiliated companies, the configuration data from that affiliated company is added to the new user profile data.
7. The user payment is validated (charge of the credit card or debit from bank account or any other types of payments). Assuming that all the payment data is fine, the system proceeds to step 8.

8. A new record for the user is created in the User Profile Database and the user data is stored in the User Profile Database and User Data Database.

9. Profile manager 51 may also check to see if the local system device 42 or 44 is already registered with the TSP, depending if the local system is installed and the version of the installed local system the flow will follow one of the three paths in the above described cases.

In this case, the affiliated company when pre-register the user will establish through its policy if the user configuration and/or user data can be used with the home/personal account. If the user data can be shared, the user will be able to access the files he/she is working on at home.

As an additional security the affiliated company can limit the sharing of data and configuration to a particular set of devices (through the device MAC number or another distinguishing device number/name).

FIGS. 9 and 10 also illustrate the situation in which the user is already registered with the TSP, as follows:

Referring first to FIG. 9, the following sequence of steps happens:

1. The user access the web site of his/her Technology Service Provider through a web browser.
2. The user starts the registration going to the Registration Page (which is accessible through a web link in the Technology Service Provider web page).
3. The user fills the registration form with his/her personal data (name and address) and affiliation (if the affiliated college/university/company is going to pay for him/her) and the services that he/she wants to subscribe to and at the end clicks on the submit button.
4. When the user submits the registration form through the Registration Page, the registration information is sent to the TSP web server which in turn sends the data to profile manager 51.
5. The TSP checks the registration data against the User Profile database. The TSP may try to retrieve all the users with the same registration data (same name and/or identification like the tax identification—Social Security Number—and address/phone number and affiliated company if given). For each retrieved user, the system may attach the associated data from the User Profile Database and User Data database especially the affiliated company if any and the local device information.
6. Profile manager 51 may check if at least one record was returned. In this case, a record will be found.
7. If the registration has already been done, the user is redirected to the login page.
8. See the user login scenario where user will login to the TSP (See "User Login Scenario, herein).

(c) User Login Scenario:

In preferred aspects, the user can login to the Run-time System through the web browser, through any of the Run-time System login short-cuts (which can be placed anywhere in the local device desktop/menu), and through accessing for the first time any of the Run-time system functions (via local device short-cuts: desktop or menu). For simplicity, the present description refers to "login through the web browser" when the user uses the web browser, and "login through the run-time system" for all the other accesses.

The access through the run-time system using the login window is illustrated in FIGS. 11, 12 and 13, as follows.

FIG. 11 illustrates the user login through the web browser with incorrect information (username and/or password), as follows:

The following steps refer to Flowchart 3 (in FIG. 11):

1. The user goes to the TSP web site and then to the login page.
2. The user fills the login page form with his/her username and password and affiliated company (optional).
3. The username, password, affiliated company and the local device information is sent to remote system 50.
4. Profile manager 51 checks if there is a username/affiliated company (if given) already registered (stored in the User Profile Database). If there is, the system loads the user profile data from the User Profile Database.
5. The system checks the given username/password/affiliated company (if given) with the stored data retrieved in the previous step.
6. If the given username/password/affiliated company (if given) does not match the values stored in the User Profile database, the system sends the error message back to the user browser and redirects to the log web page so that the user can try again with the corrected data.

Preferably, a maximum number of attempts is established by the TSP and after this number of successive unsuccessful login attempts is made, the account is locked and the user needs to call the TSP to unlock it or answer one or more secret personal questions (like the name of the first boyfriend/girlfriend or the city of the honeymoon, etc.).

FIG. 11 also illustrates user login through the web browser with correct information (username and/or password), as follows:

The following steps refer to Flowchart 3 (of FIG. 11):

1. The user goes to the TSP web site and then to the login page.
2. The user fills the login page form with his/her username and password and affiliated company (optional).
3. The username, password, affiliated company and the local device information is sent to remote system 50.
4. Profile manager 51 checks if there is a username/affiliated company (if given) already registered (stored in the User Profile Database). If there is, the system loads the user profile data from the User Profile Database.
5. The system checks the given username/password/affiliated company (if given) with the stored data retrieved in the previous step.
7. If the given username/password/affiliated company (if given) match the values stored in the User Profile database, it checks the device against the list of registered devices for that user. If local device 42 or 44 is not in the list of registered devices, the system will proceed to the "Device Registration Sub-scenario" described below.
8. If local device 42 or 44 is already registered or if local device 42 or 44 is registered in step 8, a session token is created for this user session and this token and the user profile for the device is sent back to the local device.
9. Local device 42 or 44 logs in the user and starts the session using the session token sent (see "Local User Login Sub-scenario", herein). Preferably, Login information is sent to audit component 55 (see "Auditing Sub-scenario" herein).

FIG. 12 illustrates user login through the run-time system form with incorrect information (username and/or password), as follows:

The following steps refer to Flowchart 4 (of FIG. 12):
1. The user goes to the run-time system login form.
2. The user fills the run-time system login form with his/her username and password and affiliated company (optional).
3. The username, password, affiliated company and the local device information is sent to Profile Manager 41.
4. Profile manager 41 packs the information and passes it to Profile Manager 51.
5. The information is sent to remote system 50.
6. Profile manager 51 checks if there is a username/affiliated company (if given) already registered (stored in the User Profile Database). If there is, the system loads the user profile data from the User Profile Database.
7. The system checks the given username/password/affiliated company (if given) with the stored data retrieved in the previous step.
8. If the given username/password/affiliated company (if given) do not match the values stored in the User Profile database, the system sends the error message back to profile manager 41 which in turn sends the error to service manager 49. Service manager 49 displays the run-time system login with an error message so that the user can try again with the corrected data. Preferably, a maximum number of attempts is established by the TSP and after this number of successive unsuccessful login attempts is made, the account is locked and the user needs to call the TSP to unlock it.

FIG. 12 also illustrates user login through the run-time system form with correct information (username and/or password), as follows:

The following steps refer to Flowchart 4 (of FIG. 12):
1. The user goes to the run-time system login form.
2. The user fills the run-time system login form with his/her username and password and affiliated company (optional).
3. The username, password, affiliated company and the local device information is sent to profile manager-41.
4. Profile manager 41 packs the information and passes it to profile manager 51.
5. The information is sent to remote system 50.
6. Profile manager 51 checks if there is a username/affiliated company (if given) already registered (stored in the User Profile Database). If there is, the system loads the user profile data from the User Profile Database.
7. The system checks the given username/password/affiliated company (if given) with the stored data retrieved in the previous step.
8. If the given username/password/affiliated company (if given) match the values stored in the User Profile database, the system establishes the User Profile (see User Profile Determination algorithm) and checks the device against the list of registered devices for that user. If local device 42 or 44 is not in the list of registered devices, the system will proceed to device registration (see "Device Registration Sub-scenario" herein).
10. If local device 42 or 44 is already registered or if the device is registered in step 10, a session token is created for this user session and this token and the user profile for the device is sent back to the local device. S
11. The Local device 42 or 44 logs in the user and start the session using the session token sent (see "Local User Login Sub-scenario" herein). Login information is sent to the audit component (see scenario "Auditing Sub-scenario" herein).

In this case for some reasons, there is no connection from the local device to the Remote System. (Like the case of the laptop roaming without Internet connection, for example: user starts to use the laptop during flight). Since it is possible that no internet connection is available in this case, the user will be able to login only through the run-time system login form at the local system.

This is illustrated in FIG. 13, as login without connection to the remote system, as follows:

The following steps refer to Flowchart 5 (of FIG. 13):
1. The user goes to the run-time system login form (see "User Login Scenario" herein).
2. The user fills the run-time system login form with his/her username and password and affiliated company (optional).
3. The username, password, affiliated company and the local device information is sent to profile manager 41.
4. Profile manager 41 senses that it is not able to communicate with profile manager 51.
5. Profile manager 41 retrieves the user profiles stored in the Local Cache (managed by data manager 46).
6. Profile manager 41 compares the local cache data with the data given by the user.
7. If one of username/password/affiliated company (if given) does not match, an error message is sent back to the service manager that displays the run-time system login. Form with error message so that the user can try again with the corrected data.
8. If all of username/password/affiliated company (if given) match with the local cached data, a temporary local session token is generated.
9. Local device 42 or 44 logs in the user and start the session using the temporary session token just created (see "Local User Login Sub-scenario", herein).
10. The temporary local session token is stored in the local cache.

(d) Login into a Temporary Local Device:

When using a temporary local device, security measures can be taken to avoid leaving private information in the local device which can be accessed by other users of this device.

Alternatively, the user can classify another Satellite device as unsafe device and the same measures taken to a temporary local device will apply. In this case, besides the user name and password additional information will be needed to log into the system, this information can be the user private key stored in a USB flash memory drive or two very personal information (like the wedding anniversary date and the best friend first or last name).

(e) Local User Login Sub-scenario:

This scenario is the final part of the User Login Scenarios when the user successfully logs in. Described below is what happens in local device 42 or 44 after the user successfully logs in.

The following steps refer to Flowchart 6 (of FIG. 14). (It is assumed that the username, encrypted password, affiliated company—if given—and session token is passed):
1. Profile manager 41 retrieves the user profiles stored in the Local Cache (managed by Data Manager 46).
2. Profile manager 41 compares the local cache data with the data given by the user.
3. In the case the user data in cache does not match the given data, the local cache is updated.
4. Profile manager 41 generates a local token for the session using the timestamp and the user profile.

5. The local session token is stored in the local cache associated with the remote session token.
6. Local device 42 or 44 is configured using the retrieved User Configuration. This may include change of user settings in the local device as well as installing user services not present in local device 42 or 44. Not all of the user services will be installed, the number and the user services installed may depend on the user profile configuration and the local device profile. (For example, properties like if the lazy loading is enabled or not and the number of services to be installed at once—and Properties like if the lazy loading is enabled or not and the number of services to be installed at once).
7. Control is passed to service manager 49. Service manager 49 will display the user menu as configured by the user profile. The user will be able to access his/her services and data from that point forward.
8. The session data can be sent to auditor 45. Audit processing will be done asynchronously (see "Auditing Sub-scenario" herein).
9. In background, the user data (like documents and associated data) can be synchronized with the user data stored in remote system 50.
10. Data synchronization will take place in background.

(f) Device Registration Sub-scenario:

Flowchart 7 of FIG. 15 illustrates the process of registering a new local device for use in the system. This scenario is the part of the User Login Scenarios where the user successfully logs in but the local device 42 or 44 used is not registered in the list of user local devices. Device registration is illustrated in detail below.

The following steps refer to Flowchart 7 (of FIG. 15). (It is assumed that the username, encrypted password, affiliated company—if given—match the value stored in the user profile database and the user profile data have been loaded from the User Profile Database):

1. Check if the local device can be attached to the user profile. The following checks can occur:
    (i) Validate if the local device type is in the list of enabled devices for the affiliated company (only valid if the user is using an affiliated company account to log in) or for the user account, and/or
    (ii) Check the number of already registered devices for the user and the limit of registered devices (configured at registration time and stored as property of the user profile).
2. In case the validation fails, the error message is sent back to the user.
3. In case of validation failure, the login process stops with failure. The error message could indicate possible corrective actions, including (i) adding this device paying premium (temporarily or in a permanent basis), and (ii) decline the use of the TSP services in this device, or replace another pre-registered device for this device. (For example, in such a situation, from now on the user will not be able to replace the new device for a period of consecutive 10 days.
4. If the device will be used for both personal/home use and professional use, the user profile for home/personal use is aggregated with the professional use.
5. The changes in the user profile and device list can be persisted.
6. The final user profile and device profile can be stored in the User Profile Database. Local device 42 or 44 can be added to the list of devices for the user and the list will be updated in the User Profile Database.
7. The profile manager can check in the Device Profile (part of the User Profile Database) and in the login data if Local System 40 has already been installed in local device 42 or 44.

The remaining steps can differ according to the following cases:

(Case A) The Local System 40 has Never Been Installed in Local Device 42 or 44:
  8b. The new user profile, the device profile and the local system installation files are sent to the local system as well as the newly created session token.
  9.b The user accepts to download the installation files. Installation begins after the files are downloaded.
  11. User profile is inserted in the local system cache.
  12. Local device logs in the user and start the session using the session token sent (see "Local User Login Sub-Scenario", herein).

(Case B) An Older Version of Local System 40 has Already Been Installed in the Local Device 42 or 44:
  8a. The user profile manager 41 checks the version of local system 40 with .the most recent version.
  9. In this case, the local device has an older version of local system 40. Then the new user profile, the device profile and the Local System upgrade installation files are sent to the local system as well as the newly created session token.
  10c. The user accepts to download the installation files. Upgrade begins after the files are downloaded.
  11. User profile is inserted in the local system cache.
  12. The Local device logs in the user and start the session using the session token sent (see "Local User Login Sub-scenario" herein).

(Case C) The Most Recent Version of Local System 40 has Already Been Installed in Local Device 42 or 44:
  8a. The new user profile, the device profile and the local system installation files are sent to the local system as well as the newly created session token.
  9a. In this case, local device 42 or 44 has the latest version of local system 40. Then the new user profile and the device profile are sent to the local system as well as the newly created session token.
  11. User profile is inserted in the local system cache.
  12. The Local device logs in the user and start the session using the session token sent (see "Local User Login Sub-scenario", herein).

(g) User Profile Determination Algorithm:

After the user is authenticated in the remote system, but before the result are sent back to local device 42 or 44, the system can determine the User Profile for this session. This information is based on the User Profile, allowing the system to establish what resources and services will be available to the user as well as the rules which will mandate what the user can do in this session.

To establish the User Profile, the following rules may optionally be applied: (1) if the affiliated organization/user profile information is given, then this profile can be used; (2) if the local device is registered to one of the User Profile, this User Profile can be used; (3) the preferred User Profile can be used; (4) if there is no eligible User Profile then the session can end the user can be logged off the system; (5) if there is not a preferred User Profile registered, then the system can ask the user which of the User Profiles he/she will use for this session; and (6) once the main User Profile is established, the system consolidates all the user profiles that can be joined with the main User Profile (if any).

In order to determine if the User Profile is eligible to be merged, the user profile rule may state how it will merge to other User Profiles. Choices may include: (1) the User Profile can never be merged to the other ones; (2) the User Profile can make available only the public resources with the other ones; (3) all the User Profile resources will be available to the other ones but the private resources will be read-only and not sharable and not included in any other document; (4) all the User Profile resources will be available to the other profiles without restrictions; (5) all the User Profile notifications will be available to the other profiles. In addition to that, the User Profile can optionally identify the other users with whom the resources can be shared or sent.

(h) Service Interaction Scenario:

Since only service categories I (Stand-alone Hosted Local Service) and II (Hosted Local and Remote Service) have user interaction mediated by the Local System, this scenario will only refer to those two types of services (see "Lightweight On-Demand Service" herein for an explanation of those service types).

(Case A: The User starts Hosted Service (type I or II))

The following refers to Flowchart 8 (of FIG. 16):
1. Normally the user will call the service choosing the service through the User Services Menu.
2. Although the User Services Menu contains only the services to which the user has access, step 2 re-checks the user access to the service just to make sure the user will not bypass the security check in case the service is called directly or pro grammatically.
3. Control is passed to Profile Manager 41 which returns the User Access Privileges back to Service Manager 49.
4. Service Manager 49 checks if the user is allowed to use the callable service (if the user subscribes to the called service).
5. If the user does not have permission to access the called service, the user is prompted to add the service:
   a. To be used once (with an one-time fee) or
   b. to be used permanently (with an additional monthly fee), or
   c. decline the service.
If the user wants to decline the service, the interaction ends.
6. If the user wants to add the service, Service Manager 49 passes the control to profile manager 41 to persist the change.
7. Profile Manager 41 updates the User Profile with the new service access. First the control is passed to profile manager 41 which in turn calls profile manager 51 and persists the new service into the User Profile Database.
8. In order to locate the called service, service manager 49 calls service locator 43.
9. Service Locator 43 locates the service, using service locator 53 if necessary (see "Find Service Location Sub-Scenario" herein).
10. Since service manager 49 has the location of the called service, it will call the service and from now on the user will interact with the called service. A typical interaction between the user and the called service is illustrated in the next case (FIG. 17).

(Case B: Typical User Interaction with the Lightweight On-Demand Service)

Flowchart 9 (FIG. 17) shows a typical user interaction with the Lightweight On-Demand Service, as follows:
1. The user starts requesting a feature of the Lightweight On-Demand Service (for example, a Search for Contact Information).
2. The Lightweight On-Demand Service starts processing the user requesting sending the form to be filled with data (in the case of a search for a Contact Information, the form will contain the type of search to be executed and the value to search for).
3. The user starts filling the form with the input data (like Searching for a Contact Information using the beginning of the last name and filling up the value of the start of the last name to be searched).
4. The user sends the form back to the Lightweight On-Demand Service.
5. The Lightweight On-Demand Service processes the request. Before the final processing the interaction can have several form interactions, that means that steps 2 to 4 can be repeated as many times as necessary). After the final processing ends the result(s) is(are) sent back to the user.
6. The result(s) is (are) displayed to the user. The caller (service-user) sends the metrics of this interaction to the auditor component to be accounted for (see "Auditing Sub-scenario", herein).

(i) Find Service Location Sub-Scenario:

Flowchart 10 (FIG. 18) shows how the service location can be found. For this scenario one of the two following cases apply:

(Case A The Service Location is Cached in the Local System)

The following numbers refer to the Flowchart 10 (of FIG. 18):
1. Service locator 43 checks the list of service location that it keeps in the cache.
2a. In case it finds the service location in the cache, service locator 43 retrieves the service location handle.
10. Service locator 43 returns the service location handle found in cache.

(Case B) The Service Location is Not Cached but it is Registered in the Local System)

The following numbers refer to the Flowchart 10 (of FIG. 18):
1. Service locator 43 checks the list of service location that it keeps in the cache.
2b. In this case the service location is not found in the cache, then service locator 43 checks if the service is registered locally.
3b. The service is a registered local service, then it retrieves the Local Service Location in the Local Service Registry.
8. Using the service location, it looks up the service and gets the service handle.
9. The Service Handle is stored in the local system cache.
10. The Service Locator returns the service location handle.

(Case C The Service Location is Not Cached and it is not Registered in the Local System but it is in the Remote System Cache)

The following numbers refer to the Flowchart 10 (of FIG. 18):
1. Service locator 43 checks the list of service location that it keeps in the cache.
2b. In this case the service location is not found in the cache, then service locator 43 checks if the service is registered locally.
3c. The service is not a registered local service, then service locator 43 sends a request to service locator 53.
4c. Service Locator 53 searches for the service location in its cache.
5c. In this case it is found in service locator 53's cache, and the service location is retrieved from the cache.
7. The service location is returned to service locator 43.
8. Using the service location, service locator 43 looks up the service and retrieves the service handle.

9. The Service Handle is stored in the Local System cache.
10. Service locator 43 returns the service location handle.

(Case D The Service Location is not Cached and it is not Registered in the Local System and it is not in the Remote System Cache)

The following numbers refer to the Flowchart 10 (of FIG. 18):

1. Service locator 43 checks the list of service location that it keeps in its cache.
2b. In this case the service location is not found in the cache, then service locator 43 checks if the service is registered locally.
3c. The service is not a registered local service, then service locator 43 sends a request to service locator 53.
4c. Service Locator 53 searches for the service location in its cache.
5d. In this case the service location is not found in service locator 53's cache, service locator 53 looks up the service location in the service catalog.
6. The service location is stored in the cache of Service Locator 53.
7. Service Location is returned to the Service Locator 43.
8. Using the service location, Service Locator 43 looks up the service and retrieves the service handle.
9. The Service Handle is stored in the Local System cache.
10. The Service Locator returns the service location handle.

(j) Run-time System Jobs:

These jobs run in the background without user intervention, and may optionally include Auditing sub-scenarios, Data Synchronization scenarios, Classification of data scenarios, Event Notification scenarios, Re-connection to remote system scenarios, and run-time system pre-load scenarios, as follows:

(i.) Auditing sub-scenario (Case 1: Local Auditing)

Flowchart 11 (of FIG. 19) illustrates how local auditing may be done:

1. Auditor 45 requests data manager 46 to store the auditing data in its cache.
2. Data manager 46 stores the audit data in its local cache.
3. Auditor 45 sends the data to Auditor 55 (see next case: Remote Auditing)

(Case 2: Remote Auditing)

Flowchart 12 (of FIG. 20) illustrates how remote auditing may be done:

1. Auditor 55 requests data manager 56 to store the auditing data in the database.
2. Data manager 56 stores the audit data in the Audit Database.

(ii) Data Synchronization scenario

Flowchart 13 (of FIG. 21) illustrates basic exemplary steps in a data synchronization scenario. Data synchronization may occur after one of these events: (1) a login, (2) a connection to remote system 50 is re-established, or (3) X minutes from the last synchronization, where X is determined by the Service Contract and the local device type.; (4) large amounts of data have been changed.

The counter is reset in events (1) or (2) above, such that even though more than X minutes have passed since the last synchronization, the system resets the counter to 0. In this case, data synchronization does not happen because of this event (but the data synchronization actually happens because of event (1) i.e. login). In event (4), above, what represents large amounts is determined by the Quality of the Service in the Server Contract and the local device type. Implicitly implied in this scenario is that the last successful synchronization timestamp is known.

In login (#1, above), data may be sent by Remote System 50 (it is retrieved from the User Profile Database) during the login and then compared with the same data stored in the Local Cache.

For re-connection to remote system 50 (#2, above), the last successful synchronization timestamp is also sent by remote system 50 during the re-connection handshake and it is compared against the same data stored in the Local Cache.

The third event (#3, above) will have the last successful synchronization timestamp due to one of the two first events (#1 and #2, above) or due to the last synchronization in the current user session. The same applies for the last event (#4, above).

All the configuration data and documents can have two timestamps associated with them: (1) the time it was created; and (2) the last time it was modified. The data synchronization relies on these last modified time of these data, it compares the last modified time with the last successful synchronization timestamp to find which data to propagate. Preferably, the data synchronization will conform to the data synchronization standard: SyncML.

The following steps refer to the flowchart 13 (of FIG. 21):

1. Data manager 46 compares the last modified time of all the local cache data against the last successful synchronization timestamp and determines what data has changed.
2. The new and changed data is sent to data manager 56.
3. The new and changed data plus the last successful synchronization timestamp and the session token is sent to data manager 56.
4. Data Manager 56 retrieves all the changed data and timestamps from the databases in the Central Storage as well as the associated timestamps. In addition to this, data manager 56 may also retrieve all the new and changed data stored in central storage 54, in order to determine this data the same procedure that was done in local system 40 is done: the last successful synchronization timestamp can be compared against the last modified timestamp in all the data stored in central storage 54.
5. For each changed data from local system 40, the last modified timestamp in local system 40 is compared against the last modified timestamp retrieved from central storage 54. In the case that the timestamp in local system 40 is newer than the timestamp in the central storage 54, the data from local system 40 replaces the data in central storage 54. For the new data from local system 40, no check is necessary and the data is stored in central storage 54.
6. All the changed data from local system 40 replace the data in central storage 54. The new data from local system 40 is also stored in central storage 54.
7. The new data from local system 40 and the changed data from local system 40 is stored in central storage 54.
8. The new data from central storage 54 is send to local system 40. The data that is sent to local system 40 depends on the bandwidth of the connection to local system 40 and on the device type. Some low bandwidth connection or device with small storage could limit the size of each data sent as well as the total size of the data sent. In low bandwidth connections, the data can be split in order to optimize the connection.
9. The new data is sent to local system 40, the data can be broken and sent piece by piece for connection with low bandwidth.

10. Data manager 46 receives the new data. It compares the remote system timestamp with the local cache timestamp to determine with changes to store in the local cache and stores the data in the local cache.
11. Data manager 46 updates the last successful synchronization time to the current timestamp.
12. Data manager 46 sends the new last successful synchronization timestamp to remote system 50.
13. The new last successful synchronization timestamp is sent to the data manager 56.
14. The new last successful synchronization timestamp and the session properties (local device properties) are stored in central storage 54 (in the User Profile Database).

(iii) Classification of data scenario

Every user document (like e-mail, note, text-graphics file, spreadsheet, presentation, multimedia file) can be pre-classified when stored in the central storage. The pre-classification uses pre-defined categories. Later the user can decide if he/she will keep, change or remove the pre-classification according to his/her needs. The document is pre-classified when it is first stored in the central storage and when large amount of change are done in the document after it is replaced in the central storage.

A general pre-defined category list may be available to all the users. On top of that, an affiliated company can create several category lists and assign them to some of the users (a big corporation can create one category list for the whole corporation and each department/branch can create its own category list and assign to its associates). In addition to those lists, the user can create his/her own list.

The lists of pre-defined categories may include (in order of precedence): (1) a user pre-defined list; (b) an affiliated company department pre-defined list; (3) an affiliated company pre-defined list; and (4) a general pre-defined list.

The automatic pre-classification and the actual document classification can be different. The automatic-assigned categories can become actual categories when the user explicitly acknowledges it. The automatic pre-classification happens after the indexing of the document where the most used words (except of the words that are used in most in the document language like 'the', 'a', 'an', etc) are associated with the document as document keywords. Document keywords are used in user searches and can be edited by the user.

Flowchart 14 (FIG. 22) describes the steps involved in the indexing and the automatic pre-classification of the documents, as follows:
1. The new document is added to the central storage or large amount of changes is done in the document. After storing in central storage 42, the document is sent to data manager 56.
2. The document is analyzed and the most used words (keywords) in the document are retrieved (the most used words exclude most used words in the language, for example in English the words 'the', 'a', 'an', 'is', 'are' and others will never be used as most used words in a document). The most used words in the document can be retrieved from central storage 54 if it has capabilities to do so.
3. The most common words are associated with the document as document keywords.
4. Data manager 56 retrieves the user pre-defined categories (and the affiliated company categories).
5. Data manager 56 compares the document keywords with the pre-defined categories, the keywords can also become categories if they are also a pre-defined category.
6. The keywords and recommended categories are stored in central storage 54 in association with the document.

(iv) Event Notification scenario

The user can specify a list of events that he/she wants to be notified. The user can choose to be notified every time a shared document is changed. In this case, the event to be monitored is any change in the particular shared document. The notification can be made through e-mail, cell phone text messaging or simply by a message displayed on the local device he is connected at the moment.

In another aspect of the invention, if the user wants to receive a cell phone text messaging when his/her bosses sent an e-mail with the subject containing URGENT only when he/she is not connected to any Local Device capable to receive e-mails from time to time.

Flowchart 15 (FIG. 23) illustrates the steps that the event notification system will perform.
1. The event that is monitored happens.
2. The event data is sent to notification manager 58.
3. The Notification event contains all the data relative to that event, its structure can change from one type of event to another.
4. Notification manager 58 receives the Event data and retrieves from the Event Map all the actions associated with that event.
5. With the event actions and the event data the Event Dispatcher decides which Event processor(s) should handle that event.
6. The Event Processor receives the event data and processes it. In this step it can call other remote services or use one of the services running in remote system 50.
7. If additional processing needs to be done in local device 42 or 44, the event processor packages the event data and the new data resulted from the processing and sends to the notification agent 48.
8. Event data is processed by notification agent 48. It can optionally communicate to Service Manager 49.

(v) Re-connection to the Remote System scenario

After the local device re-establishes connection with the Remote System, a new authentication will occur and depending on the period of time the remote system was out of reach a new session can be created, as illustrated in Flowchart 16 (FIG. 24), as follows:

Flowchart 16 illustrates the steps taken in re-connecting to remote system 50:
1. Local device 42 or 44 re-establishes the connection to remote system 50.
2. Service manager 49 senses that the connection has been established and passes control to profile manager 41.
3. Profile manager 41 retrieves the current session information (username, encrypted password and/or local session token, remote session token—if any, session timestamps, etc) and sends it to profile manager 51.
4. User Profile, session data and device information is sent to remote system 50.
5. Profile manager 51 compares the session data with the last session data it has for the user to determine if this session had been established with remote system 50 before, and if yes, for how long local system 40 was disconnected from remote system 5Q for this session. Preferably, it will not create a new session if local system 40 was disconnected from remote system 50 in a period less than X minutes. (The number of minutes is established by the Service Contract and the Local Device Type).

6. If a new session needs to be created, the remote login happens. (See flowchart 3 of FIG. 10 and "User Login Scenario", herein).
7. If the last session needs to be re-established, profile manager 51 retrieves the user profile from the User Profile Database.
8. The User Profile validates the local session data with the remote session data (compares the remote session tokens stored in the Local System with the one in the remote system and compares the timestamps) to make sure it is the same session.
9. If the local session and remote session data differs, it asks the user to re-login from the local device.
10. If the local session and remote session data matches, it combines the two session data, updates some of the session properties and stores them in the User Profile Database.
11. Profile manager 51 sends the new combined data to profile manager 41.
12. The data is send to the audit component to be stored.
13. The new combined session data is sent back to local system 40.
14. Local system 40 continues with the re-login of the user (see flowchart 6 of FIG. 14 and "Local User Login Sub-scenario", herein).

(vi) Run-time system pre-load scenario

During the local device start-up, the run-time system 40 will be pre-loaded, as illustrated in Flowchart 17 (of FIG. 25). The pre-load will load the local components and the connection to the siblings.

The steps of flowchart 17 (FIG. 25) are as follows:
1. Local device 42 or 44 starts.
2. The local device start-up procedure will include the start-up of service manager 49.
3. Service manager 49 starts up. The service manager start up will vary with the device type. The start up will include (but not limited to) configuration of the Local device operating system like setting of environment variables.
4. Service manager 49 starts all the other components from local system 40. The start up will vary with the device type. But the most powerful devices, it can include the start of the processes related to the components, the loading of the local cache data, the lookup of the components in the remote system, etc.
5. Start-up of local system 40 ends.

(vii) Third-Party TSP Authentication

In order to perform User Profile merge, the TSP user may be connected to (called current TSP) should be able to authenticate the User Profile in another TSP. This can be performed with a well-known third-party authentication protocol. Note that the user password with the other TSP is never sent to the TSP system.

Flowchart 18 refers to this scenario:
1. After being prompted, the user keys in the password with the third-party TSP.
2. Profile manager 41 generates a random number Ra.
3. Ra is sent to profile manager 51 with the third-party TSP name and the user name in the third-party TSP.
4. Profile Manager 51 looks up the Third-Party TSP Profile Manager and sends it the user name in the Third-Party TSP and a reference number Nb.
5. The Third-Party TSP Profile Manager receives the message from the current TSP and generates a new key K. Then it takes current TSP name and adds it to the key K, they both are encrypted by the user password in the Third-Party TSP thus the message is EKuser(current TSP||K). The reference number Nb, the user name in the Third-Party TSP and the key K are then added to the encrypted message. The final message is then encrypted by the current TSP public key and send to the current TSP.
6. The current TSP decrypts the message using its private key. It reads the reference number Nb and the user name in the Third-Party TSP and validates them. It reads the new key K.
7. Profile manager 51 generates another random number Rb. Then it takes the first part of the message which it can not decrypt since it does not have the user password in the Third-Party TSP and add another message with Ra and Rb, this part will be encrypted by the new key K: EKk(Ra||Rb). At the end it sends the message to profile manager 41.
8. Profile Manager 41 in possession of the user password in the Third-Party System decrypts the first part of the message (EKuser(currentTSP||K)) and uses K to decipher the second part of the message EKk(Ra||Rb). It validates Ra which it has generated before. Now it knows that the user password in the Third-Party TSP is correct and sends Rb back to the Remote System so that it knows that the password is correct.
9. Profile Manager 51 receives Rb and validates with the number it has generated thus it also knows that the user password is correct.

(viii) Conclusion:

The on-demand software application and service system and method of the present invention allows users to avoid paying for expensive software suites and licenses which may contain elements they do not require, and allows them to purchase or rent software applications on an as-needed basis. This will save on purchase and license fees and also avoids the need for more powerful computers and more memory for storage of multiple software applications, some of which are not needed. This arrangement will also reduce the increasing cost of complex management of software licenses and upgrades. Such upgrades will be automatically taken care of by the system of this invention, by automatically upgrading the user's local system when they next log on. The present invention provides a seamless environment where the user can log onto the system from any registered device and readily access any of their selected applications or add new applications as needed. The user's device will be automatically configured with the same or a similar set of user saved settings and easy access to the desired features, depending on the limits of the device being used, each time the user logs on.

Although an exemplary embodiment of the invention has been described above by way of example only, it will be understood by those skilled in the field that modifications may be made to the disclosed embodiment without departing from the scope of the invention.

What is claimed:
1. An on-demand software system, comprising:
a remote processing system providing a plurality of software applications, operating systems and central data storage; and
a local processing system running on an authorized user's local device, wherein the local system comprises:
(a) a local profile manager that loads, updates and validates a user profile, the user profile being selected by the user when the user forms a contract with an operator of the remote system, the user profile comprising both user identifying information and local device identifying information including:
(i) a set of devices from where the user can access the system;
(ii) a list of the types of software applications that the user can view or manipulate;

(iii) a list of the software services to be used by the user when viewing or manipulating the software application types; and
(iv) a set of rules establishing from where and when the software applications can be accessed or manipulated; and wherein the user profile is session based, and wherein the software applications to be accessed or manipulated are associated with the session based user profile such that a user having multiple profiles accesses or manipulates only the software applications associated with the particular user profile that is running in the session;
(b) a local service locator that finds services requested by the user;
(c) a local data manager that finds and stores data;
(d) a local service connector that establishes communication between the local system and the remote system; and
(e) a local service manager that displays a user services menu and resource explorer to the user; and handles the interaction between the user and the system, the user service menu displaying the on-demand software applications accessible to the user, and wherein the user chooses the on-demand software applications from the user services menu, and wherein standard software applications are chopped into smaller functional units to be separately made available to the user; and wherein the remote system comprises:
(a) a remote profile manager that receives user requests from the local profile manager;
(b) a remote service locator that communicates with the local service locator to find the software applications requested by the user;
(c) a remote data manager that communicates with the local data manager to store and retrieve requests from the local data manager; and
(d) a remote service connector that communicates with the local service connector; and
wherein the remote system sends instructions to the local system configuring the local system to operate the software applications after the session based user profile has been sent from the local system to the remote system, and wherein the local device is not continuously connected to the remote system during operation of the local device.

2. The system of claim 1, wherein the local and remote systems together comprise a set of processes supporting on-demand lightweight software applications.

3. The system of claim 1, wherein the remote system installs the local system on the authorized user's local device.

4. The system of claim 1, wherein the local system synchronizes with the remote system to update local services.

5. The system of claim 1, wherein the user generates the user profile.

6. The system of claim 5, wherein the user services menu provides user access to the software services selected by the user in accordance with the user profile.

7. The system of claim 6, wherein the user service menu comprises a service specific menu and a user defined menu.

8. The system of claim 1, wherein the user profile comprises a set of devices from where the user can access the system.

9. The system of claim 1, wherein the user profile comprises a list of types of software resources that the user can access.

10. The system of claim 1, wherein the local and remote systems together support user registration, user login, device configuration, and usage accounting.

11. The system of claim 1, wherein the local system further comprises:
(f) a local auditor that records local service metrics for each user interaction with the system.

12. The system of claim 1, wherein the local system further comprises
(f) a local notification agent that sends notifications from the local service manager to the remote system and receives notifications sent from the remote system to the local service manager.

13. The system of claim 1, wherein the remote system further comprises:
(e) a remote auditor that records service metrics for different users' interaction with the system.

14. The system of claim 1, wherein the authorized user's local device is selected from the group consisting of a personal computer, a laptop, a personal digital assistant or a cell phone.

15. A method of providing software applications and services to local users on an on-demand basis, by:
setting up a contract with a user to provide a user-selected menu of software applications and services from a remote server system onto a local system comprising one or more user devices on an on-demand basis, wherein standard software applications are chopped into smaller functional units to be separately made available to the user through a user services menu displaying the on-demand software applications;
storing user data and user settings; and
configuring the user's device with the user saved settings and applications,
wherein the remote system server sends instructions to the local system configuring the local system to operate the software resources and services after the user profile has been sent from the local system to the remote system server, and wherein the local device is not continuously connected to the remote system during operation of the local device, and wherein the user profile is session based, and wherein the software applications to be accessed or manipulated are associated with the session based user profile such that a user having multiple profiles accesses or manipulates only the software applications associated with the particular user profile that is running in the session.

16. The method of claim 15, further comprising:
automatically downloading a local system on the user's device when the user logs in.

17. The method of claim 16, further comprising:
automatically updating the local system on the user's device when the user logs in.

18. The method of claim 15, wherein the user generates a unique user profile by customizing a user services menu on a local device.

19. The method of claim 15, further comprising:
the remote service contacting a third party service provider to provide a software application to the authorized user if the software application is not provided by the remote system.

20. The method of claim 1, wherein the user profile comprises an aggregate of different profiles.

* * * * *